(12) United States Patent
Tomioka et al.

(10) Patent No.: US 7,557,974 B2
(45) Date of Patent: Jul. 7, 2009

(54) OPTICAL SCANNING APPARATUS AND IMAGE FORMING APPARATUS USING THE SAME INCLUDING RELATIONSHIP BETWEEN INTERVAL BETWEEN DEFLECTOR AND SCANNED SURFACE AND A NATURAL CONVERGENT POINT

(75) Inventors: Yuichi Tomioka, Utsunomiya (JP); Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/243,124

(22) Filed: Oct. 1, 2008

(65) Prior Publication Data

US 2009/0022518 A1    Jan. 22, 2009

Related U.S. Application Data

(62) Division of application No. 11/672,996, filed on Feb. 9, 2007, now Pat. No. 7,450,284.

(30) Foreign Application Priority Data

Mar. 6, 2006  (JP) .............................. 2006-059541

(51) Int. Cl.
G02B 26/08    (2006.01)
(52) U.S. Cl. .................. 359/205.1; 359/212.1; 347/259
(58) Field of Classification Search ......... 359/204–208, 359/196, 212, 216–219; 347/243–244, 258–261
See application file for complete search history.

(56) References Cited

U.S. PATENT DOCUMENTS

| 5,233,454 | A | * | 8/1993 | Sakuma et al. | ........... 359/196.1 |
| 5,680,244 | A | * | 10/1997 | Ono et al. | ................ 359/205.1 |
| 5,715,079 | A | * | 2/1998 | Ono | ........................ 359/205.1 |

FOREIGN PATENT DOCUMENTS

JP    08062529  A  *  3/1996

OTHER PUBLICATIONS

European Search Report for Application No. 07102249.5-2217 (Apr. 16, 2007).*

* cited by examiner

*Primary Examiner*—Stephone B Allen
*Assistant Examiner*—Jennifer L. Doak
(74) *Attorney, Agent, or Firm*—Cowan, Liebowitz & Latman, P.C.

(57) ABSTRACT

A compact optical scanning apparatus capable of desirably correcting an f characteristic, a field curvature, and other aberrations, and an image forming apparatus using the same, which includes an incident optical system (LA) for guiding a beam from a light source (1) to a deflector (4) and an imaging optical system (LB) for guiding the beam to a scanning surface (7), wherein a scanning field angle region where $1<3$ and $2<3$ are satisfied exists within effective scanning field angle region, where in a main scanning cross section and for a scanning field angle 1, 2 represents an angle between a principal ray of beam incident on an optical element included in the imaging optical system and located closest to the scanning surface and an optical axis of the imaging optical system and 3 an angle between a principal ray of a beam from the optical element and the optical axis.

10 Claims, 13 Drawing Sheets

IMAGE HEIGHT (mm)

OPTICAL SCANNING APPARATUS AND IMAGE FORMING APPARATUS USING THE SAME INCLUDING RELATIONSHIP BETWEEN INTERVAL BETWEEN DEFLECTOR AND SCANNED SURFACE AND A NATURAL CONVERGENT POINT

CROSS-REFERENCE TO RELATED APPLICATIONS

This application is a divisional of application Ser. No. 11/672,996, filed Feb. 9, 2007, now U.S. Pat. No. 7,450,284, the entire disclosure of which is hereby incorporated by reference.

BACKGROUND OF THE INVENTION

1. Field of the Invention

The present invention relates to an optical scanning apparatus and an image forming apparatus using the same. For example, the present invention is suitable for an image forming apparatus such as a laser beam printer, a digital copying machine, or a multi-function printer, which adopts an electrophotographic process.

2. Description of the Related Art

Up to now, in an optical scanning apparatus, a light beam which is optically modulated in response to an image signal in a light source unit and emitted therefrom is periodically deflected by, for example, an optical deflector including a polygon mirror.

The light beam deflected by the optical deflector is condensed in a spot shape on a surface of a photosensitive recording medium by an imaging optical system having an fθ characteristic.

Therefore, the surface of the photosensitive recording medium is scanned with the light beam to perform image recording.

In recent years, downsizing of the entire image forming apparatus such as a laser beam printer, a digital copying machine, or a multi-function printer, and a simplification (reduction in cost) thereof are advanced.

With the advance, it is desirable to make the optical scanning apparatus more compact and simple.

Therefore, up to now, various optical scanning apparatuses designed to be made compact have been proposed (Japanese Patent Application Laid-Open No. 2001-296491 and Japanese Patent Application Laid-Open No. 2000-267030).

According to Japanese Patent Application Laid-Open No. 2001-296491, in order to shorten an interval between a deflecting surface of an optical deflector and a surface to be scanned (optical path length), a scanning field angle is increased. In addition, a shape of an imaging lens in a main scanning direction (meridional line shape), which is included in an imaging optical system, is suitably set.

Japanese Patent Application Laid-Open No. 2000-267030 discloses an optical scanning apparatus in which a converged light beam is incident on an imaging lens in a main scanning cross section.

According to Japanese Patent Application Laid-Open No. 2000-267030, in the main scanning cross section, a meridional line shape of an imaging optical system is set such that the light beam incident on the imaging optical system is refracted in a direction departing from an optical axis in a case where a scanning field angle is smaller than 77% of a maximum effective scanning field angle, and the light beam incident on the imaging optical system is refracted in a direction approaching the optical axis in a case where the scanning field angle is larger than 77% of the maximum effective scanning field angle (see FIG. 18).

In the case of Japanese Patent Application Laid-Open No. 2001-296491, in the main scanning cross section, the meridional line shape of the imaging optical system is set such that light beams incident on the imaging optical system at all scanning field angles are refracted in the direction approaching the optical axis. Therefore, when the interval is to be shortened to perform scanning with the same scanning width, it is necessary to further increase the scanning field angle.

However, when the scanning field angle is increased, an amount necessary to refract the light beams in a scanning field angle region whose scanning field angle is large becomes extremely large.

Because of this reason, there arises a problem in that an fθ characteristic, a field curvature, and other aberrations cannot be corrected in an optical system whose optical path length between the deflecting surface of the optical deflector and the surface to be scanned is short.

In the case of Japanese Patent Application Laid-Open No. 2000-267030, the meridional line shape of the imaging optical system is set such that the light beam incident on the imaging optical system is refracted in the direction departing from the optical axis in the case where the scanning field angle is smaller than 77% of the maximum effective scanning field angle.

In the imaging optical system set as described above, when the interval between the deflecting surface of the optical deflector and the surface to be scanned (optical path length) is to be further shortened, an amount necessary to refract the light beam in a direction departing from the axis in a region whose scanning field angle is small becomes extremely large. Therefore, there arises a problem in that an fθ characteristic, a field curvature, and other aberrations cannot be corrected, or the meridional line shape is distorted.

According to Japanese Patent Application Laid-Open No. 2000-267030, in the main scanning cross section, a meridional line shape of an imaging lens disposed closest to the surface to be scanned is set so as to satisfy θ2>θ3 in the entire region of the imaging lens, where θ2 denotes an angle formed between a light beam incident on the imaging lens and the optical axis and θ3 denotes an angle formed between a light beam emitted from the imaging lens and the optical axis (see FIG. 17).

An interval between a final surface of the imaging lens and the surface to be scanned (optical path length) is the longest interval among surface intervals along the optical paths between the deflecting unit and the surface to be scanned. Therefore, when the meridional line shape is set so as to satisfy θ2>θ3, an effect of shifting, from the optical axis, a position on the surface to be scanned 7 which the deflected and reflected light beam reaches, is not sufficiently obtained even at the same scanning field angle. Thus, there arises a problem in that the optical path length cannot be shortened.

SUMMARY OF THE INVENTION

Therefore, an object of the present invention is to provide a compact optical scanning apparatus capable of desirably correcting an fθ characteristic, a field curvature, and other aberrations, and an image forming apparatus using the optical scanning apparatus. According to one aspect of the invention, there is provided an optical scanning apparatus, including a light source unit; a deflecting unit; an incident optical system for guiding a light beam emitted from the light source unit to the deflecting unit; and an imaging optical system for imaging the light beam deflected by the deflecting unit onto a surface to be scanned, in which the following condition is satisfied, $0.3<Sd/L<1$, where L (mm) represents an interval in an optical axis direction of the imaging optical system, between a deflecting surface of the deflecting unit and the surface to be scanned and Sd (mm) represents an interval between the deflecting surface of the deflecting unit and a natural convergent point, and a scanning field angle region in which $|\theta 1|<|\theta 3|$ and $|\theta 2|<|\theta 3|$ are satisfied exists in an entire effective scanning field angle region, where in a main scanning cross section and for a finite scanning field angle $\theta 1$ (deg.), $\theta 2$ (deg.) represents an angle formed between a principal ray of a light beam incident on an imaging optical element LR included in the imaging optical system and an optical axis of the imaging optical system and $\theta 3$ (deg.) represents an angle formed between a principal ray of a light beam emitted from the imaging optical element LR included in the imaging optical system and the optical axis of the imaging optical system.

According to a further aspect of the invention, in the optical scanning apparatus, the scanning field angle region is changed from a region in which $|\theta 1|<|\theta 3|$ and $|\theta 2|<|\theta 3|$ are satisfied to a region in which $|\theta 1|>|\theta 3|$ and $|\theta 2|>|\theta 3|$ are satisfied as an absolute value $|\theta 1|$ of the scanning field angle increases.

According to a further aspect of the invention, in the optical scanning apparatus, letting $\theta a$ (rad) be a scanning field angle which is finite, $\theta max$ (rad) be a maximum scanning field angle in an effective scanning region, K (mm/rad) be an $f\theta$ factor, and $\theta$ (rad) be an arbitrary scanning field angle, the following conditions are satisfied, $|L \times \tan \theta a| = |K \times \theta a|$ ($0<|\theta a|<|\theta max|$) and $0.3<|\theta a|/|\theta max|<0.7$, and the scanning field angle $\theta a$ satisfying the following conditions exists, $|L \times \tan \theta| < |K \times \theta|$ (when $0<|\theta|<|\theta a|$), and $|L \times \tan \theta| > |K \times \theta|$ (when $|\theta a|<|\theta| \leq |\theta max|$).

According to another aspect of the invention, there is provided an optical scanning apparatus, including: a light source unit; a deflecting unit; an incident optical system for guiding a light beam emitted from the light source unit to the deflecting unit; and an imaging optical system for imaging the light beam deflected by the deflecting unit onto a surface to be scanned, wherein the following condition is satisfied, $0.3<Sd/L<1$, where L (mm) represents an interval in an optical axis direction of the imaging optical system, between a deflecting surface of the deflecting unit and the surface to be scanned and Sd (mm) represents an interval between the deflecting surface of the deflecting unit and a natural convergent point, wherein letting $\theta a$ (rad) be a scanning field angle which is finite, $\theta max$ (rad) be a maximum scanning field angle in an effective scanning region, K (mm/rad) be an $f\theta$ factor, and $\theta$ (rad) be an arbitrary scanning field angle, the following conditions are satisfied, $|L \times \tan \theta a| = |K \times \theta a|$, ($0<|\theta a|<|\theta max|$) and $0.3<|\theta a|/|\theta max|<0.7$ and the scanning field angle $\theta a$ satisfying the following conditions exists, $|L \times \tan \theta| < |K \times \theta|$ (when $0<|\theta|<|\theta a|$), and $|L \times \tan \theta| > |K \times \theta$ (when $|\theta a|<|\theta| \leq |\theta max|$).

According to a further aspect of the invention, in the optical scanning apparatus, the following condition is satisfied, $0.85 \leq W/2L$, where L (mm) represents the interval in the optical axis direction of the imaging optical system, between the deflecting surface of the deflecting unit and the surface to be scanned and W (mm) represents an effective scanning width on the surface to be scanned.

According to a further aspect of the invention, in the optical scanning apparatus, a condition $L \leq 125$ (mm) is satisfied.

According to a further aspect of the invention, in the optical scanning apparatus, the maximum scanning field angle is equal to or larger than 30 (deg.).

According to a further aspect of the invention, in the optical scanning apparatus, the entire imaging optical system has negative axial power in the main scanning cross section.

According to a further aspect of the invention, in the optical scanning apparatus, the imaging optical element is an optical element closest to the surface to be scanned, of optical elements included in the imaging optical system, and the imaging optical element has negative axial power in the main scanning cross section.

According to a further aspect of the invention, in the optical scanning apparatus, the entire imaging optical system has negative axial power in the main scanning cross section in the entire effective scanning field angle region. According to a further aspect of the invention, in the optical scanning apparatus, an interval in the optical axis direction, between a surface-to-be-scanned side surface of an imaging optical element closest to the surface to be scanned, which is included in the imaging optical system, and the surface to be scanned is wider than each interval in the optical axis direction, between surfaces of optical elements located between the deflecting unit and the surface to be scanned.

According to a further aspect of the invention, in the optical scanning apparatus, the imaging optical element has a thickness, in the main scanning cross section, which increases and then decreases as shifted from an optical axis of the imaging optical element to an off-axis position.

According to a further aspect of the invention, in the optical scanning apparatus, every imaging optical element constituting the imaging optical system has negative axial power in the main scanning cross section.

According to a further aspect of the invention, in the optical scanning apparatus, the imaging optical element has an optical surface which is located on a deflecting unit side and has a shape which is reversed from a convex shape to a concave shape in a main scanning direction as shifted from a center of the imaging optical element to each edge portion thereof. According to a further aspect of the invention, in the optical scanning apparatus, the imaging optical element has an optical surface which is located on a surface-to-be-scanned side and has a shape which is reversed from a concave shape to a convex shape in a main scanning direction as shifted from a center of the imaging optical element to each edge portion thereof.

According to a further aspect of the invention, in the optical scanning apparatus, the imaging optical element includes an incident surface and an exit surface, each of which has a shape in which a surface position in an effective scanning region edge in the main scanning cross section is closer to the deflecting unit than a surface vertex position of the imaging optical element.

According to a further aspect of the invention, in the optical scanning apparatus, the imaging optical element has an axial shape which is a meniscus shape in the main scanning cross section.

According to another aspect of the invention, there is provided an image forming apparatus, including: the optical scanning apparatus set out in the foregoing; a photosensitive member located on the surface to be scanned; a developing device for developing, as a toner image, an electrostatic latent image which is formed on the photosensitive member scanned with a light beam by the optical scanning apparatus; a transferring device for transferring the developed toner image to a material to be transferred; and a fixing device for fixing the transferred toner image to the material to be transferred.

According to another aspect of the invention, there is provided an image forming apparatus, including: the optical scanning apparatus set out in the foregoing; and a printer controller for converting code data input from an external device into an image signal and outputting the image signal to the optical scanning apparatus.

According to the present invention, it is possible to realize the compact optical scanning apparatus capable of desirably correcting the fθ characteristic, the field curvature, and the other aberrations to obtain a high-resolution and high-quality image, and the image forming apparatus using the optical scanning apparatus.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

Embodiment 1

Figure 1:
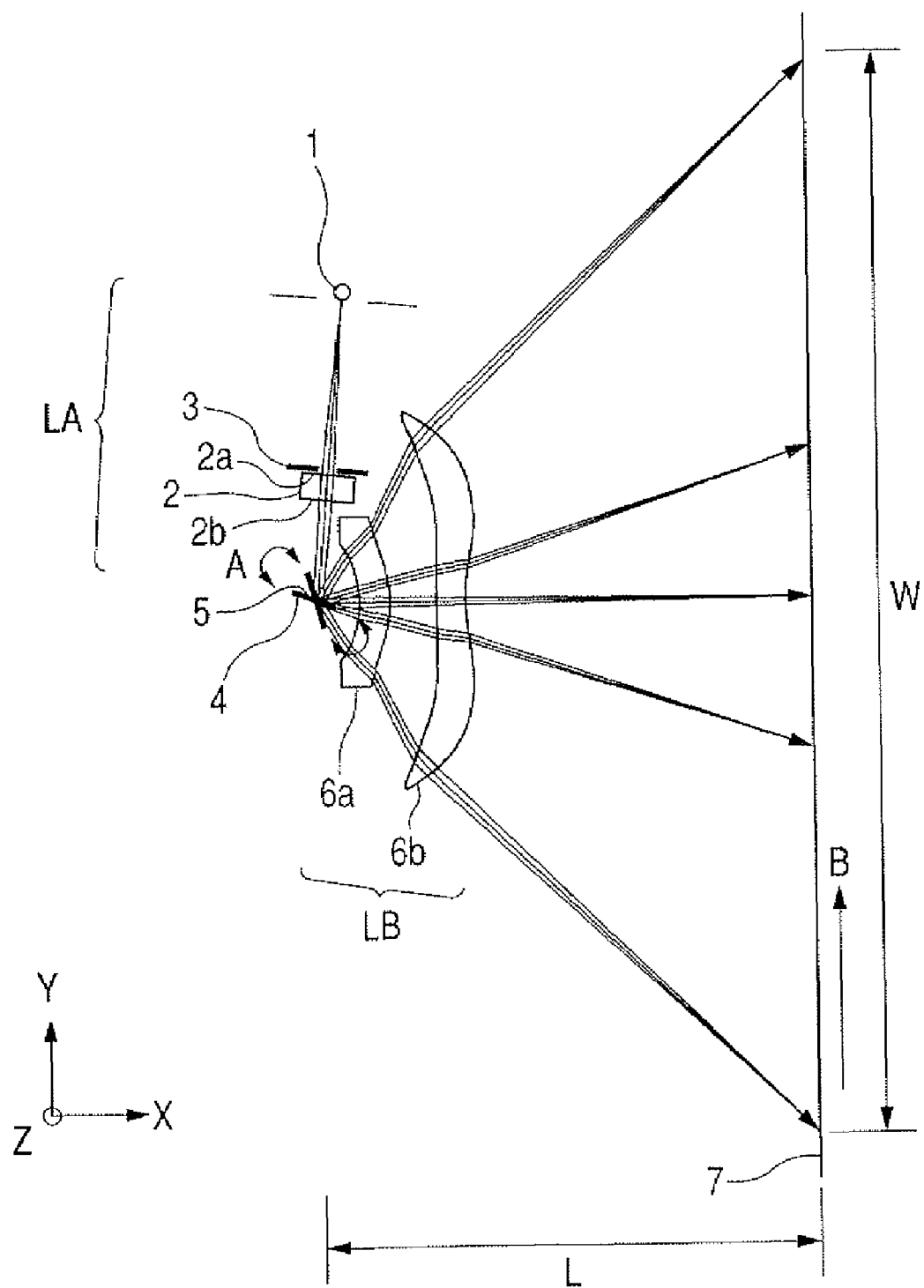
FIG. 1 is a main scanning cross sectional diagram showing an optical scanning apparatus according to Embodiment 1 of the present invention.

FIG. 1 is a cross sectional diagram showing a principal part in a main scanning direction (main scanning cross sectional diagram) according to Embodiment 1 of the present invention.

In the following description, a main scanning direction indicates a direction perpendicular to a rotational axis (or oscillation axis) of a deflecting unit and an optical axis of an imaging optical system (traveling direction of a light beam which is reflected and deflected (deflected for scanning) by the deflecting unit). A sub-scanning direction indicates a direction parallel to the rotational axis (or oscillation axis) of the deflecting unit. A main scanning cross section indicates a plane including the main scanning direction and the optical axis of the imaging optical system. A sub-scanning cross section indicates a section perpendicular to the main scanning cross section.

In FIG. 1, a light source unit 1 is a semiconductor laser having a single light emitting portion (light emitting point).

In this embodiment, a single-beam semiconductor laser is used. In the present invention, a multi-beam semiconductor laser for generating two or more light beams may be used.

An aperture (aperture stop) 3 is used to shape a light beam emitted from the light source unit 1 in a desirable and suitable beam shape.

A wavelength λ of the light beam is 780 nm (infrared laser beam).

An anamorphic lens 2 has different powers in the main scanning direction (in the main scanning cross section) and the sub-scanning direction (in the sub-scanning cross section).

A first surface (light incident surface) 2a of the anamorphic lens 2 is a convex spherical surface and used to convert a diverged light beam from the light source unit 1 into a parallel light beam.

A second surface (light exit surface) 2b of the anamorphic lens 2 is an anamorphic surface having different powers in the main scanning direction and the sub-scanning direction.

In this embodiment, the parallel light beam from the first surface 2a is converted, by the second surface 2b of the anamorphic lens 2, into a converged light beam in the main scanning direction which is to be imaged at a distance of 59.4 mm from a deflecting surface (reflecting surface) 5 of an optical deflector 4 described later.

The parallel light beam from the first surface 2a is converted, by the second surface 2b of the anamorphic lens 2, into a converged light beam in the sub-scanning direction which is to be imaged on the deflecting surface 5 of the optical deflector 4.

Therefore, according to the anamorphic lens 2, the light beam emitted from the light source unit 1 is imaged as a longitudinal linear image on the deflecting surface 5 of the optical deflector 4 in the main scanning direction.

In this embodiment, an under field optical system is provided in which a width in the main scanning direction of the light beam incident on the deflecting surface of the optical deflector is smaller than a width of the deflecting surface in the main scanning direction.

Note that the anamorphic lens 2 constitutes a component of an incident optical system LA.

The optical deflector 4 serving as a deflecting unit includes, for example, a galvano mirror oscillated at a constant angular speed in a certain range. The optical deflector 4 is oscillated at a constant speed in a direction indicated by the arrow "A" as shown in FIG. 1.

An imaging optical system LB has a condensing function and an fθ characteristic and is constituted by first and second imaging lenses 6a and 6b. Each of the first and second imaging lenses 6a and 6b has negative power on an axis in the main scanning direction. In addition, each of the first and second imaging lenses 6a and 6b has positive power on the axis in the sub-scanning direction.

In this embodiment, the imaging optical system LB images, on a photosensitive drum surface 7 which is a surface to be scanned in the main scanning cross section, a spot light beam based on image information, which is reflected and deflected by the optical deflector 4.

The imaging optical system LB achieves an optical face tangle error correction on the deflecting surface by bringing the deflecting surface 5 of the optical deflector 4 and the photosensitive drum surface 7 into an optical conjugation relation in the sub-scanning cross section.

The photosensitive drum surface 7 which is the surface to be scanned corresponds to a recording medium surface.

In this embodiment, a light beam which is optically modulated based on image information in the semiconductor laser 1 and emitted therefrom passes through the aperture stop 3. A part of the light beam is blocked by the aperture stop 3. Then, the light beam is incident on the anamorphic lens 2 and converted into a converged light beam by the first surface 2a of the anamorphic lens 2 in the main scanning cross section and the sub-scanning cross section.

The light beam from the first surface 2a of the anamorphic lens 2 is incident on the deflecting surface 5 of the optical deflector 4 as the converged light beam in the main scanning cross section and imaged as the longitudinal linear image on the deflecting surface 5 of the optical deflector 4 in the main scanning direction.

A part of the light beam which is reflected and deflected by the deflecting surface 5 of the optical deflector 4 is guided onto the photosensitive drum surface 7 through the imaging optical system LB. The optical deflector 4 is oscillated (rotated) in the direction indicated by the arrow "A". Therefore, the photosensitive drum surface 7 is optically scanned in a direction indicated by the arrow "B" (main scanning direction) to perform image information recording.

In recent years, in order to reduce a size of the main body of an image forming apparatus using an optical scanning apparatus, there is a demand for making the optical scanning apparatus compact.

In particular, in the case of a simple model in which a return mirror is not disposed in the imaging optical system, a distance between the optical deflector and the surface to be scanned is made shorter than a light beam scanning width. Therefore, there is no part of the optical scanning apparatus which protrudes to the outside of, for example, a fixing device, with the result that a compact image forming apparatus can be realized.

The optical scanning apparatus according to this embodiment is a compact and small optical scanning apparatus in which the following condition is satisfied, $$0.85 \leq W/2L \qquad (1),$$

where L (mm) denotes an interval between the deflecting surface 5 of the optical deflector 4 and the surface to be scanned 7 (optical path length) and W (m) denotes an effective scanning width on the surface to be scanned 7.

In this embodiment,

W=214 (mm) and L=100 (mm).

Therefore, $W/2L=1.07$, which satisfies the conditional expression (1).

In a conventional optical scanning apparatus, light beam incident on the optical deflector is configured to be the parallel light beam or the weak converged light beam in the main scanning direction, so the power of the imaging optical system in the main scanning direction is positive in the entire effective scanning region.

Therefore, the light beam which is deflected and reflected by the optical deflector is refracted by the imaging optical system in a direction approaching the optical axis at each scanning field angle.

Figure 2:
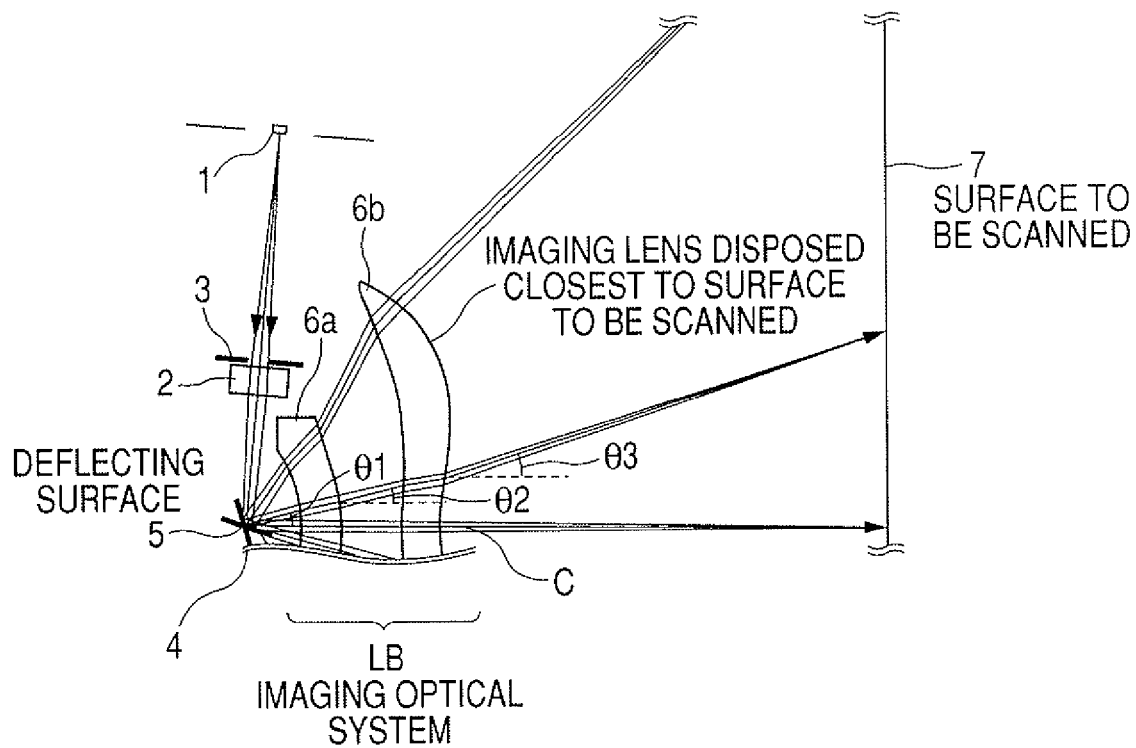
FIG. 2 is an explanatory diagram showing θ1, θ2, and θ3 according to Embodiment 1 of the present invention.

FIG. 2 is a principal part cross sectional diagram in the main scanning direction (main scanning cross sectional diagram), showing a state in which a light beam passes through a part of the imaging optical system LB at an arbitrary scanning field angle θ1.

In FIG. 2, the scanning field angle θ1 is, in other words, an angle (deg.) formed between a principal ray of the light beam which is deflected and reflected by the optical deflector 4 and then incident on the imaging optical system LB and an optical axis C of the imaging optical system LB. Angle θ2 is defined as an angle (deg.) formed between a principal ray of a light beam which is incident on the imaging lens 6b located on a side closest to the surface to be scanned 7 and the optical axis C of the imaging optical system LB. Angle θ3 is defined as an angle (deg.) formed between a principal ray of a light beam which is emitted from the imaging optical system LB and then incident on the surface to be scanned 7 and the optical axis C of the imaging optical system LB.

Figure 3:
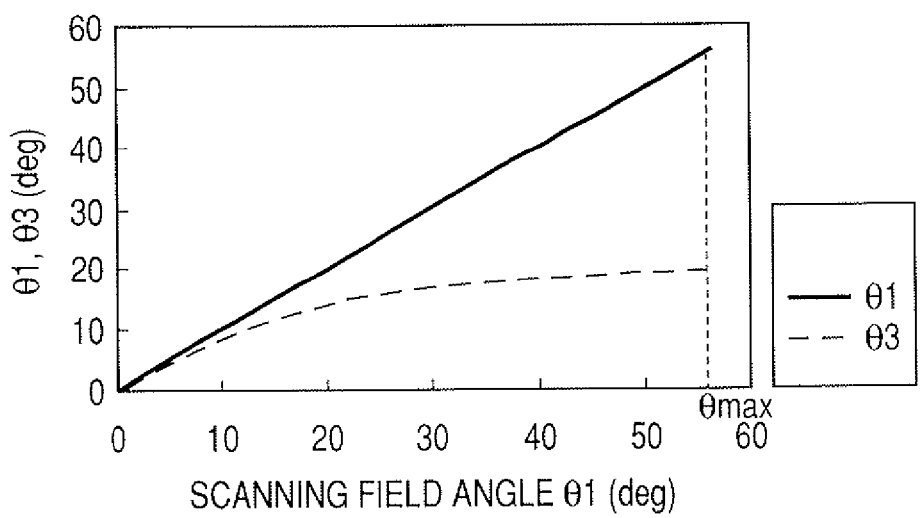
FIG. 3 is a graph showing a relationship between θ1 and θ3 in a conventional optical scanning apparatus.

FIG. 3 is a graph showing a value of the angle θ3 (deg.) formed between the principal ray of the light beam which is emitted from the imaging optical system and reaches the surface to be scanned for the arbitrary scanning field angle θ1 (deg.) and the optical axis of the imaging optical system LB in the conventional optical scanning apparatus.

As is apparent from FIG. 3, in the case of the conventional optical scanning apparatus, when the scanning field angle θ1 is 0, θ1=θ3=0. When the scanning field angle θ1 is not 0, θ3<θ1. Therefore, θ3<<θ1 as the scanning field angle θ1 increases. That is, a difference between the scanning field angle θ1 and the angle θ3 significantly increases.

As shown in FIG. 3, the light beam incident on the imaging optical system is refracted in the direction approaching the optical axis over all scanning field angles in the conventional optical scanning apparatus. Therefore, there is a limitation in scanning a region having a desirable width with the light beam while a field curvature and an fθ characteristic in the main scanning direction are maintained in a desirable state and shortening a distance (interval) between the deflecting surface and the surface to be scanned.

Thus, in this embodiment, the following method is employed in order to shorten a distance in an optical axis direction, between the deflecting surface 5 and the surface to be scanned 7 and shorten a distance between the deflecting surface 5 and the surface to be scanned 7 without an increase in scanning field angle of a light beam.

That is, in this embodiment, setting is performed such that a scanning field angle region for refracting the light beam incident on the imaging optical system LB in the direction departing from the optical axis exists in the effective scanning field angle region.

Figure 4:
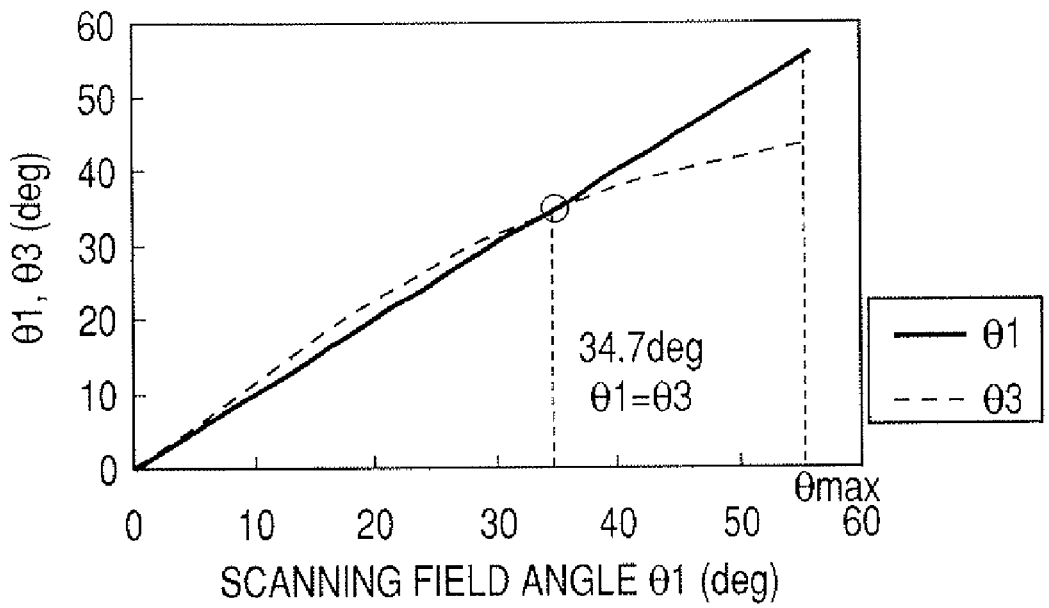
FIG. 4 is a graph showing a correlation between θ1 and θ3 according to Embodiment 1 of the present invention.

FIG. 4 is a graph showing a value of the angle θ3 (deg.) formed between the principal ray of the light beam which is emitted from the imaging optical system and reaches the surface to be scanned for the arbitrary scanning field angle θ1 (deg.) and the optical axis of the imaging optical system in this embodiment.

As is apparent from FIG. 4, according to this embodiment, the imaging optical system LB is set so as to include a scanning field angle region in which θ1<θ3 is satisfied in a scanning field angle region of 0 (deg.) <θ1<34.7 (deg.).

To be specific, in order to refract the light beam incident on the imaging optical system LB in the vicinity of the optical axis of the imaging lens in the direction departing from the optical axis, the axial power of the entire imaging optical system LB is set to a negative value.

The incident optical system LA in this embodiment is set such that a natural convergent point exists between the surface to be scanned 7 and the optical deflector 4. In addition, the axial power of the entire imaging optical system LB is set to a negative value. Therefore, the light beam is imaged on the surface to be scanned 7 in the main scanning cross section.

In this embodiment, an axial focal length of the entire imaging optical system LB, $f_{LB}$, is set to −27.29 mm.

The natural convergent point is a position at which a light beam incident on the deflecting surface is imaged in the main scanning cross section in the case where the imaging optical system is not provided.

In this embodiment, each element is set to satisfy the following condition, $$0.3 < Sd/L < 1 \quad (6),$$

where L (mm) represents the interval in the optical axis direction between the deflecting surface 5 of the optical deflector 4 and the surface to be scanned 7 and Sd (mm) represents an interval in the optical axis direction between the deflecting surface 5 of the optical deflector 4 and the natural convergent point.

The conditional expression (6) relates to a ratio between the interval Sd between the deflecting surface 5 of the optical deflector 4 and the natural convergent point and the interval L between the deflecting surface 5 of the optical deflector 4 and the surface to be scanned 7.

When Sd/L exceeds an upper limit value of the conditional expression (6), the power of the entire imaging optical system LB cannot be set to a negative value in the main scanning cross section, so an effect for refracting a desirable ray in the direction departing from the optical axis can not be obtained. This is not desirable. On the other hand, when Sd/L is smaller than a lower limit value of the conditional expression (6), the negative power of the imaging lens becomes too strong, so the shape thereof in the main scanning direction (meridional line shape) is distorted. Therefore, formation or processing is difficult. This is not desirable.

For reference, the following condition is satisfied in the conventional optical scanning apparatus.

$$1 < Sd/L$$

In this embodiment,

Sd=59.4 (mm) and L=100 (mm).

Therefore,

Sd/L=0.59, which satisfies the conditional expression (6). That is, in this embodiment, the incident optical system LA is set such that the light beam incident on the optical deflector 4 becomes strong convergence.

As described above, according to this embodiment, when the incident optical system LA is set such that the conditional expression (6) is satisfied, the effect for refracting the desirable ray in the direction departing from the optical axis can be obtained.

Further, the meridional line shape of the imaging lens is gently curved, so it is possible to realize an optical scanning apparatus whose optical path length is short and fθ characteristic is desirable.

It is more desirable to set the conditional expression (6) as follows.

$$0.40 < Sd/L < 0.90 \quad (6a)$$

In this embodiment, in the main scanning cross section, the light beam incident on the imaging optical system LB is refracted in the direction departing from the optical axis in order to increase the effective scanning width on the surface to be scanned.

However, when the refraction angle is large or the refraction angle significantly changes in the main scanning direction of the imaging lens, coma occurs, which leads to a problem in that the imaging performance on the surface to be scanned 7 deteriorates.

Thus, in this embodiment, the following setting is performed such that a refraction amount is minimized to effectively refract the light beam in the direction departing from the optical axis.

That is, in the main scanning cross section, in the case of the finite scanning field angle θ1 (deg), the angle θ2 (deg.) is defined as an angle formed between the principal ray of the light beam which is incident on the second imaging lens 6b located closest to the surface to be scanned 7 and the optical axis of the imaging optical system LB.

The angle θ3 (deg.) is defined as an angle formed between the principal ray of the light beam which is emitted from the second imaging lens 6b located closest to the surface to be scanned 7 and the optical axis of the imaging optical system LB.

In this embodiment, the meridional line shape of the second imaging lens 6b is set such that a scanning field angle region in which θ2<θ3 is satisfied exists between the axis and an intermediate image height.

Figure 5:
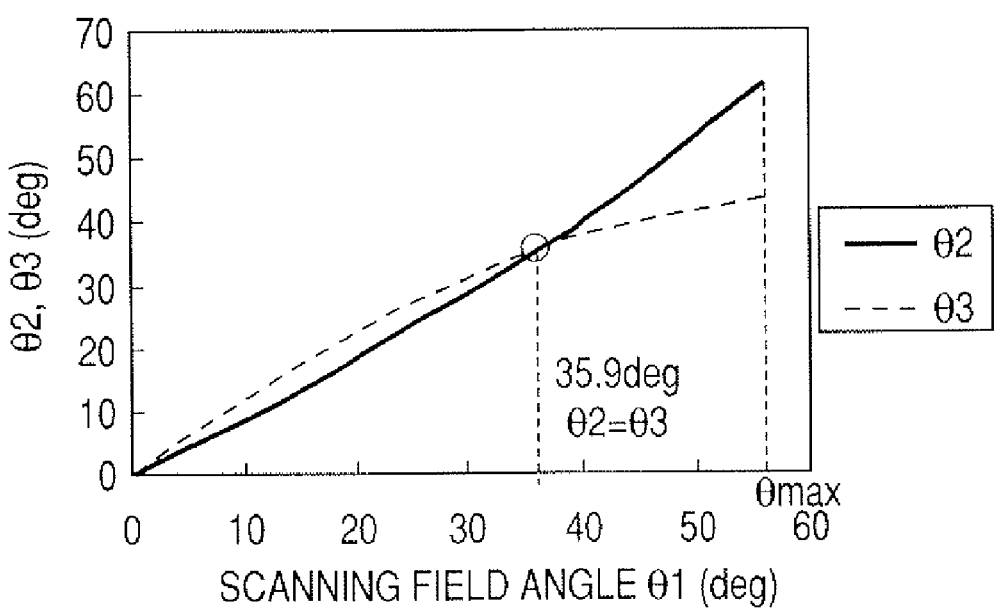
FIG. 5 is a graph showing a correlation between θ2 and θ3 according to Embodiment 1 of the present invention.

FIG. 5 is a graph showing the angles θ2 and θ3 relative to the arbitrary scanning field angle θ1 in this embodiment.

As is apparent from FIG. 5, according to this embodiment, setting is performed such that θ2<θ3 is satisfied in the scanning field angle region in which the scanning field angle θ1 satisfies "0 (deg.) <θ1<34.7 (deg.)".

In the case where the scanning field angle θ1 is equal to 35.9 (deg.), setting is performed such that θ2=θ3 is satisfied.

Setting is performed such that θ3<θ2 is satisfied in a scanning field angle region in range in which a scanning field angle θ1 satisfying "35.9 (deg.) <θ1<θmax (=56 (deg.))".

In other words, setting is performed such that θ3<θ1 and θ3<θ2 are satisfied in the scanning field angle region in which the scanning field angle θ1 satisfies "35.9 (deg.) <θ1<θmax (=56 (deg.))".

As described above, in this embodiment, in order to refract the light beam incident on the second imaging lens 6b closest to the surface to be scanned 7 at an image height near the optical axis in the direction departing from the optical axis in the main scanning cross section, the axial power of the second imaging lens 6b is set to a negative value.

In this embodiment, an axial focal length of the second imaging lens 6b, $f_{6b}$, is set to −60.87 mm.

The reason why the light beam can be effectively refracted in the direction departing from the optical axis in the case where θ3<θ2 is set is described as follows.

In this embodiment, the fθ performance and the field curvature in the main scanning direction are corrected in a desirable manner in the optical path length much shorter than the scanning width (W/2L=1.07). Therefore, a back focus (Sk=70.0 mm) of the imaging optical system LB is set such that the back focus becomes a longest interval in the optical path length (L=100 mm) of the imaging optical system LB.

That is, the imaging optical system LB is configured so that an interval in the optical axis direction between a surface located on the side of the surface to be scanned 7, of the imaging lens 6b closest to the surface to be scanned 7 in the imaging optical system LB and the surface to be scanned 7 becomes the widest among intervals in the optical axis direction, between respective surfaces of optical elements disposed between the deflecting surface 5 and the surface to be scanned 7.

Therefore, a position at which the deflected and reflected light beam reaches the surface to be scanned 7 can be kept farther away from the optical axis in a case where the angle θ3 is increased, than that in a case where the angle θ2 is increased.

In the optical scanning apparatus, it is easy to exhibit the fθ performance.

With reference to FIGS. 4 and 5, the example in which the scanning field angle θ1 is within the positive scanning field angle region (counterclockwise direction relative to the optical axis in the main scanning cross section corresponds to positive direction) is described. According to the feature of the present invention, with an increase in scanning field angle θ1, the scanning field angle region is changed from the region in which θ1<θ3 and θ2<θ3 are satisfied to the region in which θ1>θ3 and θ2>θ3 are satisfied.

In the case where the scanning field angle θ1 is within a negative scanning field angle region (clockwise rotation relative to the optical axis in the main scanning cross section), according to the feature of the present invention, with an increase in absolute value of the scanning field angle |θ1|, the scanning field angle region is changed from a region in which |θ1|<|θ3| and |θ2|<|θ3| are satisfied to a region in which |θ1|>|θ3| and |θ2|>|θ3| are satisfied.

In other words, even when the scanning field angle θ1 is within the negative scanning field angle region, the same effect as that caused by a wedge prism for refracting a light beam incident on the vicinity of the optical axis of the second imaging lens 6b in the direction departing from the optical axis is provided for the light beam.

In addition, the same effect as that caused by a wedge prism for refracting a light beam incident on the vicinity of an effective edge portion of the second imaging lens 6b in the direction approaching the optical axis is provided for the light beam.

For example, because it is desirable that the effective width of the imaging lens of the imaging optical system in the main scanning direction be narrowed to reduce a formation cost of the imaging lens, there is a tendency to dispose the imaging lens in a position close to the optical deflector.

Except for a few cases, an interval in the optical axis direction between a final surface of the imaging optical system and the surface to be scanned is set so as to be the longest surface interval along the optical paths between the deflecting surface and the surface to be scanned.

Therefore, in the optical scanning apparatus, when the lens shape of the imaging optical system LB is set such that the scanning field angle region in which θ1<θ3 and θ2<θ3 are satisfied exists in the entire scanning field angle range, the optical path length can be shortened and the coma can be corrected in a desirable manner.

Next, a specific manner for setting the thickness of the imaging lens and the meridional line shape thereof in order that the angle θ2 of the light beam incident on the second imaging lens 6b and the angle θ3 of the light beam emitted therefrom be changed to successively satisfy θ2<θ3, θ2=θ3, and θ2>θ3, with a gradual increase of the scanning field angle θ1 from 0, will be described.

Figure 6:
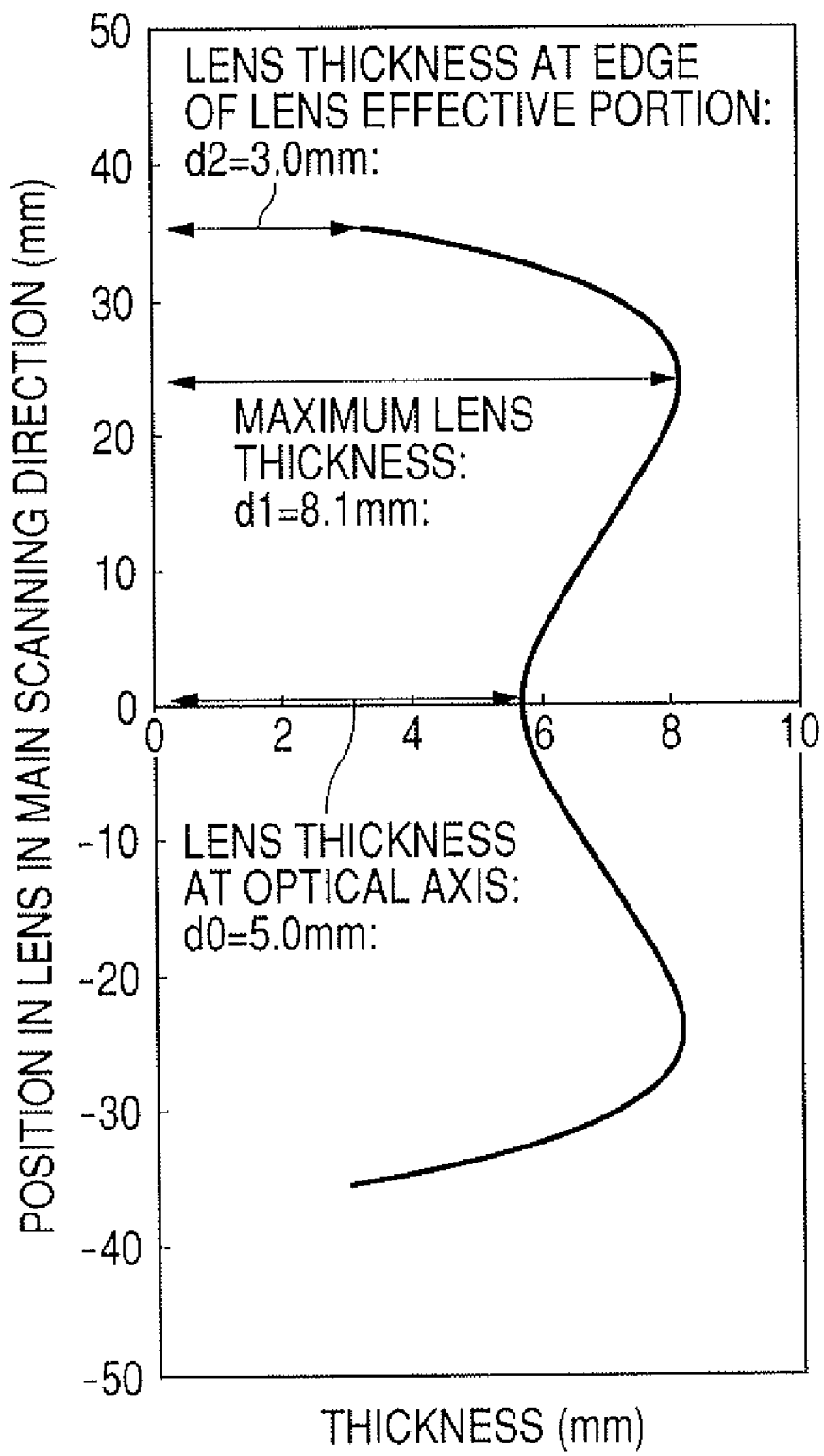
FIG. 6 shows a thickness of a lens disposed closest to a surface to be scanned according to Embodiment 1 of the present invention.

FIG. 6 is a graph showing a thickness relative to a position in the main scanning direction, of the second imaging lens 6b closest to the surface to be scanned 7 in this embodiment.

As is apparent from FIG. 6, the thickness of the second imaging lens 6b is set so as to gradually increase and then gradually decrease as shifted from the optical axis (center portion of the lens) to an effective edge portion of the lens.

Therefore, a light beam incident on the vicinity of the optical axis of the second imaging lens 6b is subjected to the same effect as that caused by a wedge prism for refracting in the direction departing from the optical axis.

In addition, a light beam incident on the vicinity of the effective edge portion of the second imaging lens 6b is subjected to the same effect as that caused by a wedge prism for refracting in the direction approaching the optical axis.

In this embodiment, in the main scanning cross section, the meridional line shape of a lens surface of the second imaging lens 6b which is located on the optical deflector 4 side is set so as to be reversed from a convex shape to a concave shape between the optical axis of the lens (optical axis of the imaging optical system) and each of edge portions.

The meridional line shape of a lens surface of the second imaging lens 6b which is located on the side of the surface to be scanned 7 is set so as to be reversed from a concave shape to a convex shape between the optical axis of the lens (center portion of the lens) and each of the edge portions.

A principal point position in the main scanning direction is set so as to be brought close to the deflecting surface 5 of the optical deflector 4 on the optical axis and brought close to the side of the surface to be scanned 7 in the edges of the lens.

Therefore, in this embodiment, an effect in which a partial magnification in the main scanning direction can be corrected to be uniform at each image height is obtained.

Figure 7:
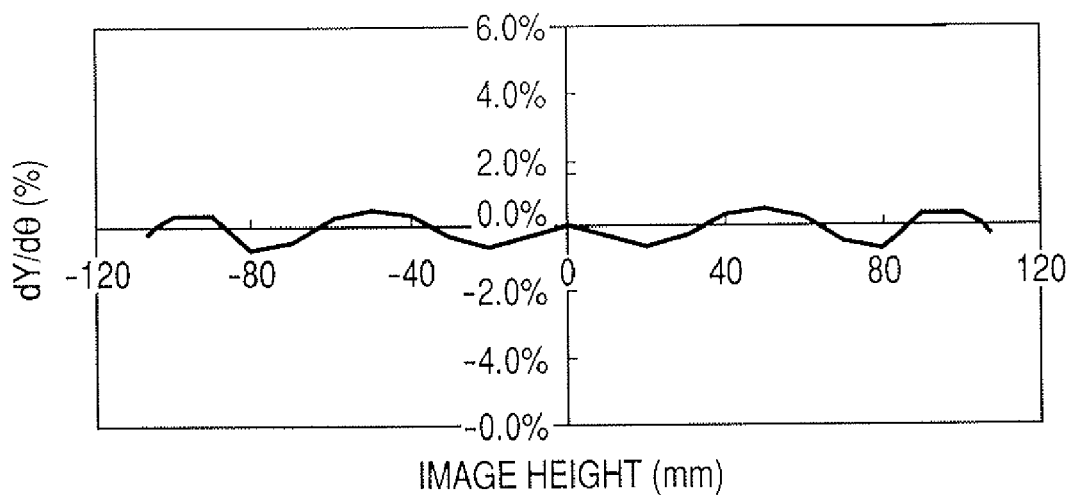
FIG. 7 is a graph showing fθ performance according to Embodiment 1 of the present invention.

FIG. 7 is a graph showing the uniformity of a partial magnification dY/dθ in the main scanning direction in this embodiment.

As is apparent from FIG. 7, a difference between the maximum and minimum values of the partial magnification dY/dθ is 1.5%. Therefore, the unevenness of the partial magnification is suppressed to a level in which there is no influence on the image.

In this embodiment, each of the meridional line shape of the lens surface of the second imaging lens 6b which is located on the optical deflector 4 side and the meridional line shape of the lens surface of the second imaging lens 6b which is located on the side of the surface to be scanned 7 is set to a shape in which a surface position in each of the effective edge portions in the main scanning direction is closer to the optical deflector 4 than a position of a surface vertex on the optical axis of the lens.

Therefore, the lens width in the main scanning direction can be narrowed. In addition, the fθ characteristic, the coma in the main scanning direction, the field curvature, and the like are corrected in a desirable manner.

As described above, in this embodiment, in the case where the entire second imaging lens 6b is to be formed in a meniscus shape, when an axial curvature radius is changed, that is, when an arc shape which is a base of the meridional line shape is set to a convex-concave shape, the entire lens becomes a meniscus shape whose curvature is very steep.

Therefore, in this embodiment, the axial shape of the second imaging lens 6b in the main scanning cross section is set to the meniscus shape (convex-concave shape). Thus, the entire second imaging lens 6b is formed in a meniscus shape whose curvature is gentle, so the second imaging lens 6b is easily formed.

In this embodiment, the thickness of the second imaging lens 6b and the meridional line shape of each lens surface are set as described above. Therefore, with a gradual increase in the scanning field angle θ1 from 0, the condition can be changed to successively satisfy θ2<θ3, θ2=θ3, and θ2>θ3.

Thus, the coma, the field curvature, and the uniformity of the partial magnification can be corrected in a desirable manner. In addition, an optical scanning apparatus whose scanning field angle is wide and optical path length is short can be obtained.

Figure 8:
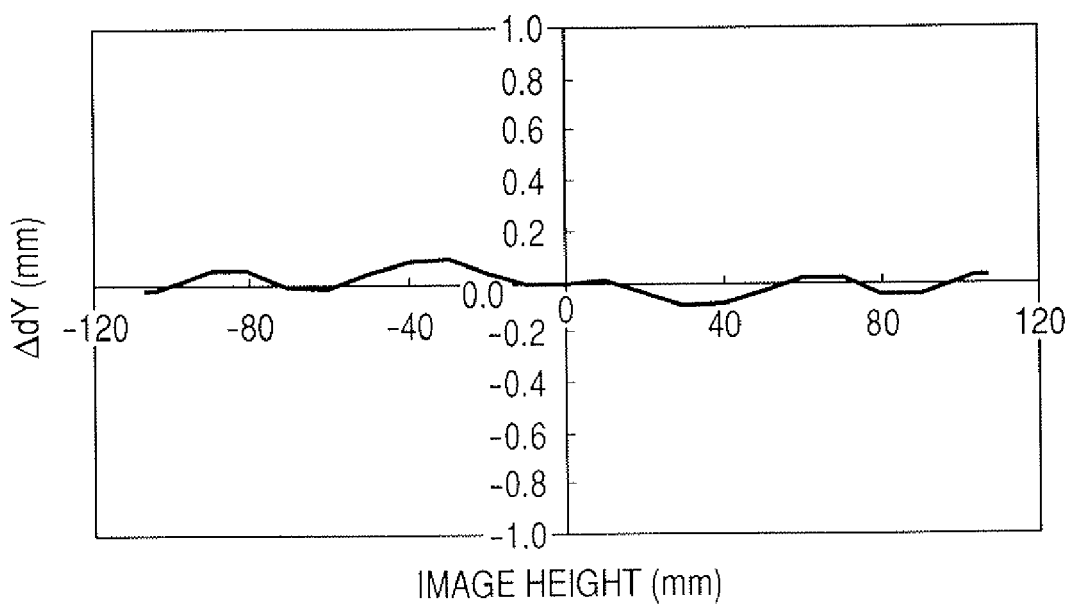
FIG. 8 is a graph showing a field curvature in a main scanning direction according to Embodiment 1 of the present invention.

FIG. 8 is a graph showing the fθ characteristic in this embodiment. In FIG. 8, the abscissa indicates an image height and the ordinate indicates a deviation amount ΔdY of an actual image height from an ideal image height in the optical scanning apparatus.

As is apparent from FIG. 8, a maximum value of the deviation amount ΔdY of the actual image height from the ideal image height is 0.09 mm, so a sufficiently desirable fθ characteristic is obtained.

Figure 9:
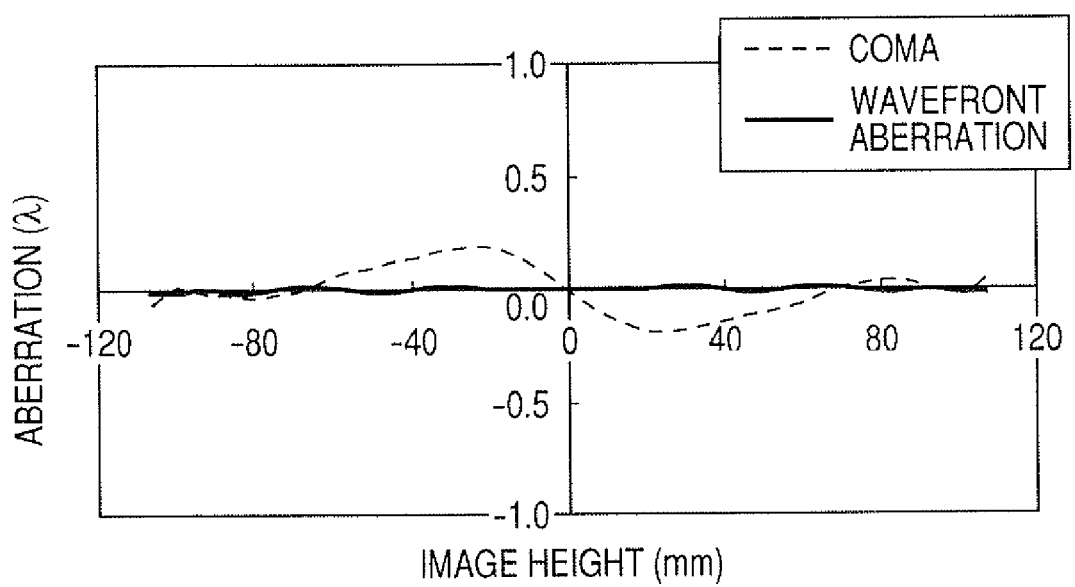
FIG. 9 is a graph showing each aberration in the main scanning direction according to Embodiment 1 of the present invention.

FIG. 9 is a graph showing each aberration in the main scanning direction in this embodiment. In FIG. 9, the abscissa indicates an image height and the ordinate indicates each aberration in the main scanning direction at respective image heights.

As is apparent from FIG. 9, a maximum value of coma is 0.19λ and a maximum value of wavefront aberration in the main scanning direction is 0.03λ, so sufficiently desirable correction is performed for each aberration.

Assume that the interval (optical path length) between the deflecting surface 5 of the optical deflector 4 and the surface to be scanned 7 is expressed by L (mm) as described above.

Here, when no image optical system is provided in the main scanning cross section, an interval between a position relative to the main scanning direction in which a principal ray of a light beam traveling at the scanning field angle θ (rad) reaches the surface to be scanned 7 and a position in which a principal ray of a light beam traveling at a scanning field angle θ of 0 (rad) reaches the surface to be scanned 7 can be expressed by $|L \times \tan(\theta)|$ (mm).

Assume that an fθ factor of the imaging optical system LB is expressed by K (mm/rad).

The fθ factor is defined as follows. That is, when an angle of a ray which is deflected and reflected by the deflecting unit is changed by 1 rad, a position in which the ray reaches the surface to be scanned is displaced by K mm in the scanning direction.

Here, when the principal ray of the light beam traveling at the scanning field angle θ (rad) passes through the imaging optical system LB in the main scanning cross section, an interval between a position in which the principal ray of the light beam reaches the surface to be scanned and a position in which a principal ray of a light beam traveling at a scanning field angle θ of 0 (rad) reaches the surface to be scanned can be expressed by $|K \times \theta|$ (mm).

Figure 10:
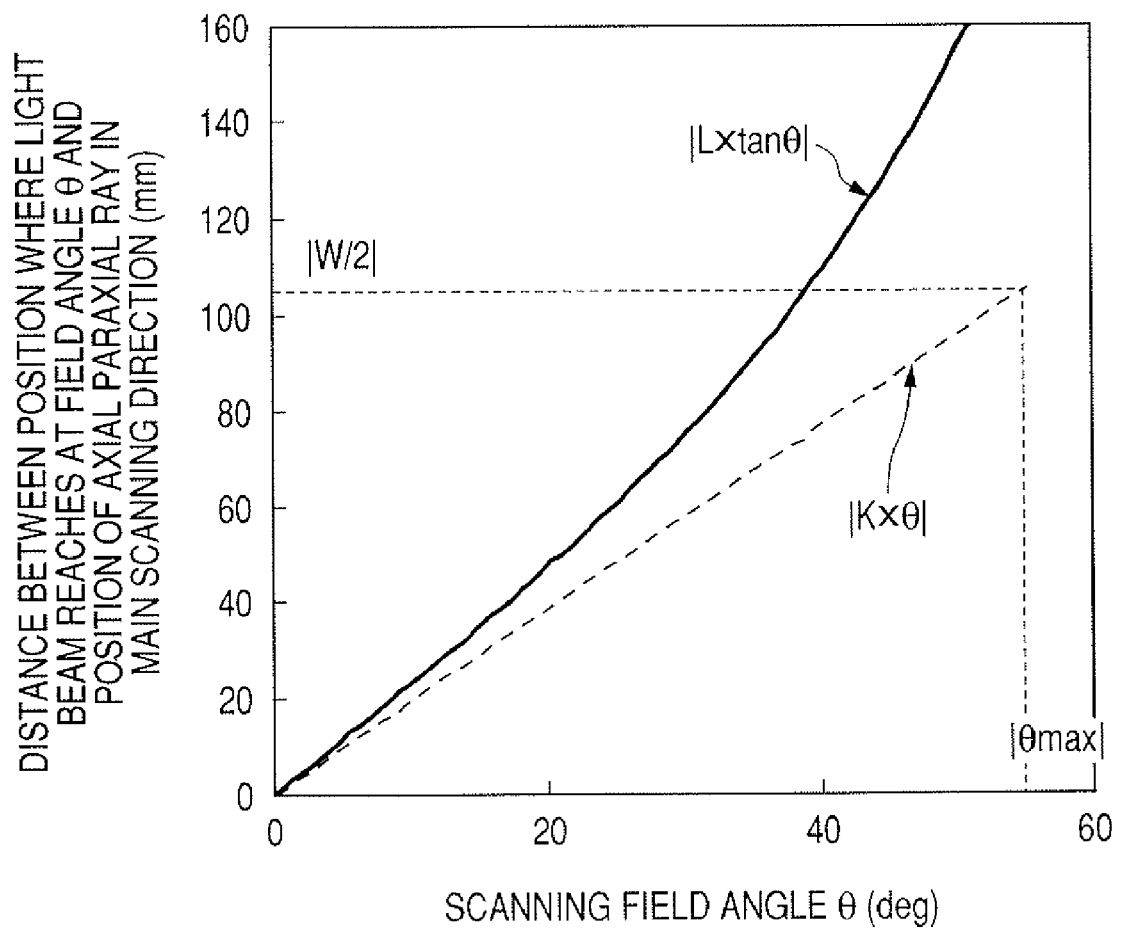
FIG. 10 is a graph showing a correlation between |K×θ| and L×tan θ in a conventional optical scanning apparatus (Japanese Patent Application Laid-Open No. 2001-296491).

FIG. 10 is a graph showing respective relationships of $|L \times \tan(\theta)|$ and $|K \times \theta|$ relative to an arbitrary scanning field angle θ in the conventional optical scanning apparatus described in Japanese Patent Application Laid-Open No. 2001-296491.

Figure 11:
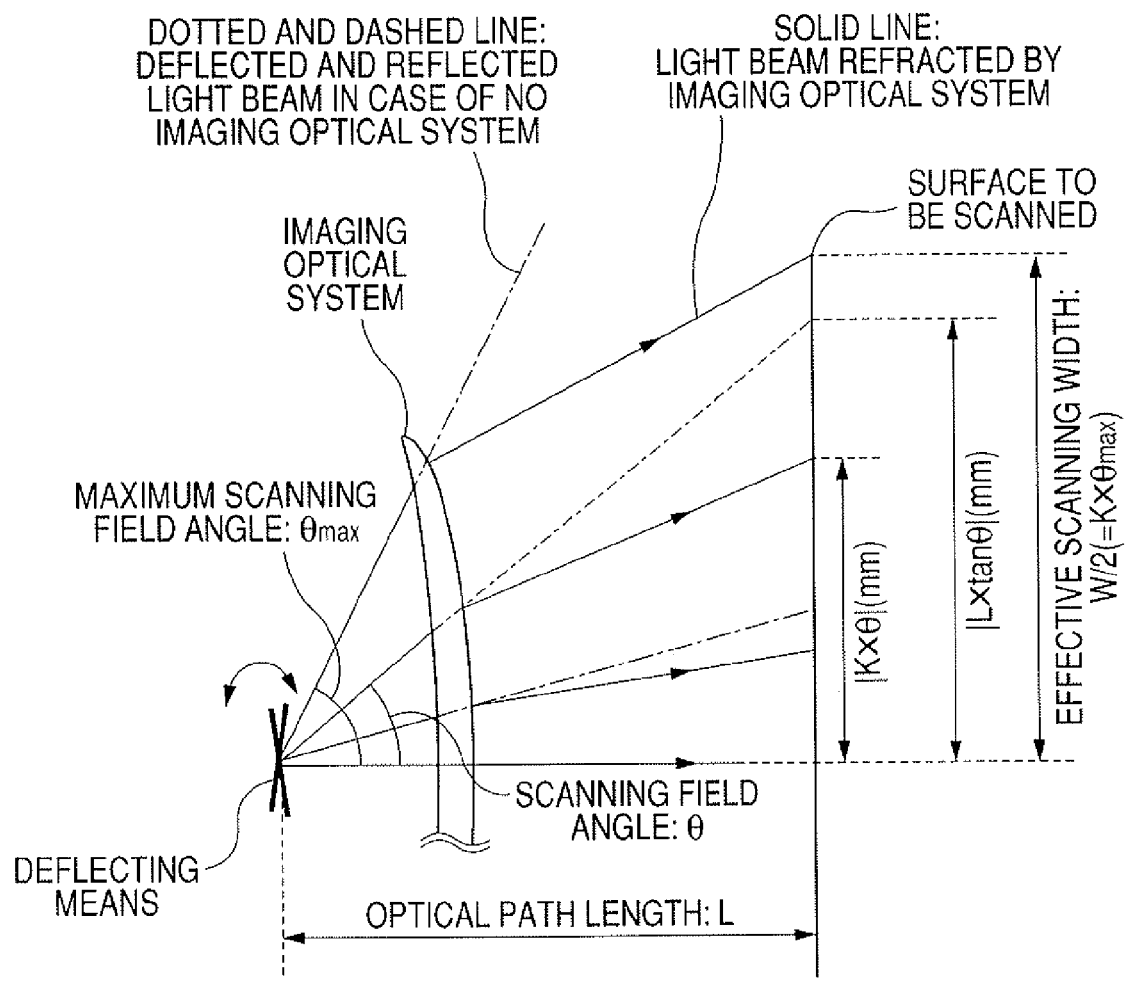
FIG. 11 is an explanatory diagram showing a relationship between |K×θ| and L×tan θ in the conventional optical scanning apparatus (Japanese Patent Application Laid-Open No. 2001-296491).

FIG. 11 is an explanatory main scanning cross sectional diagram clearly showing the respective relationships of $|L \times \tan(\theta)|$ and $|K \times \theta|$ relative to the arbitrary scanning field angle θ in the conventional optical scanning apparatus described in Japanese Patent Application Laid-Open No. 2001-296491.

In FIG. 11, for clear description, the imaging optical system is shown by a single imaging lens and a light beam traveling at the arbitrary scanning field angle θ is shown by a ray.

As is apparent from FIGS. 10 and 11, K<L is satisfied in the conventional optical scanning apparatus. Therefore, When θ=0, $|L \times \tan(\theta)|=|K \times \theta|$. Thus, a value of "$|L \times \tan(\theta)|-|K \times \theta|$" increases in a quadratic curve form as the scanning field angle θ becomes larger.

That is, when the scanning field angle θ is equal to 0 (correspondence with the optical axis), an amount of refracting a light beam necessary to obtain a desirable fθ characteristic at the arbitrary scanning field angle θ to bring a position where the light beam reaches the surface to be scanned 7 close to the optical axis is 0. The amount increases in a quadratic curve form with an increase in scanning field angle θ.

Therefore, in the case of the conventional optical scanning apparatus, when the scanning field angle θ is widened to shorten the interval (optical path length) L, the amount of refracting the light beam becomes very large in the scanning field angle region whose scanning field angle θ is large.

With an increase in scanning field angle θ, the amount of refracting the light beam rapidly changes.

For the above-mentioned reasons, the conventional optical scanning apparatus causes a problem in that the fθ characteristic, the field curvature, and other aberrations cannot be sufficiently corrected in an optical system in which a very short optical path length is set to satisfy 0.85≦W/2L which is the conditional expression (1).

Therefore, according to this embodiment, in the optical scanning apparatus which satisfies the conditional expression (1), a maximum scanning field angle in the effective scanning region, θmax (rad), L, and the fθ factor, K (mm/rad) are set so that a finite scanning field angle θa (rad) satisfying the following condition exists.

$$|L \times \tan \theta a| = |K \times \theta a| (0 < |\theta a| < |\theta \max|) \quad (2)$$

That is, in this embodiment,

θmax=56 deg., L=100 mm, and K=109.5 mm.

Therefore,

θa=28.9 (deg.)=0.52=θmax (deg.).

Figure 12:
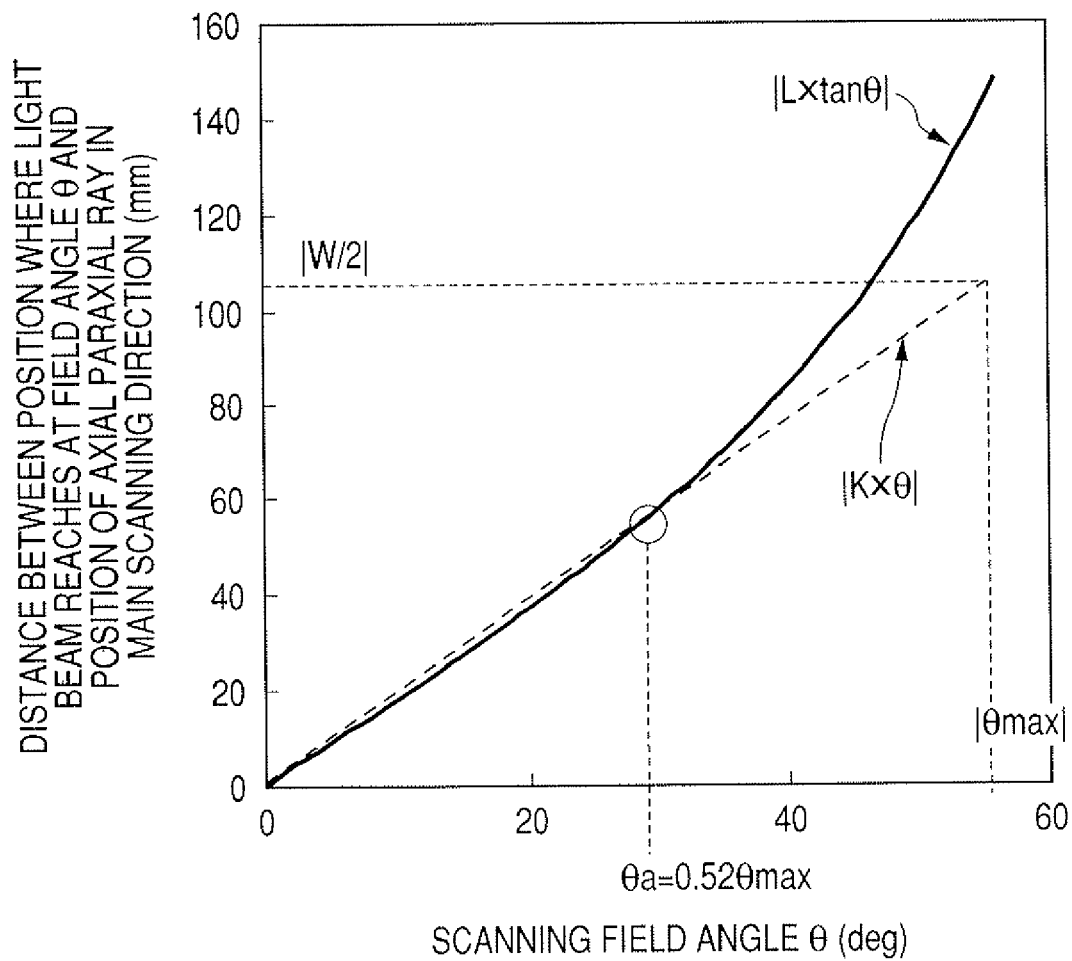
FIG. 12 is a graph showing a correlation between |K×θ| and L×tan θ according to Embodiment 1 of the present invention.

FIG. 12 is a graph showing respective relationships of $|L \times \tan(\theta)|$ and $|K \times \theta|$ relative to the arbitrary scanning field angle θ in this embodiment.

Figure 13:
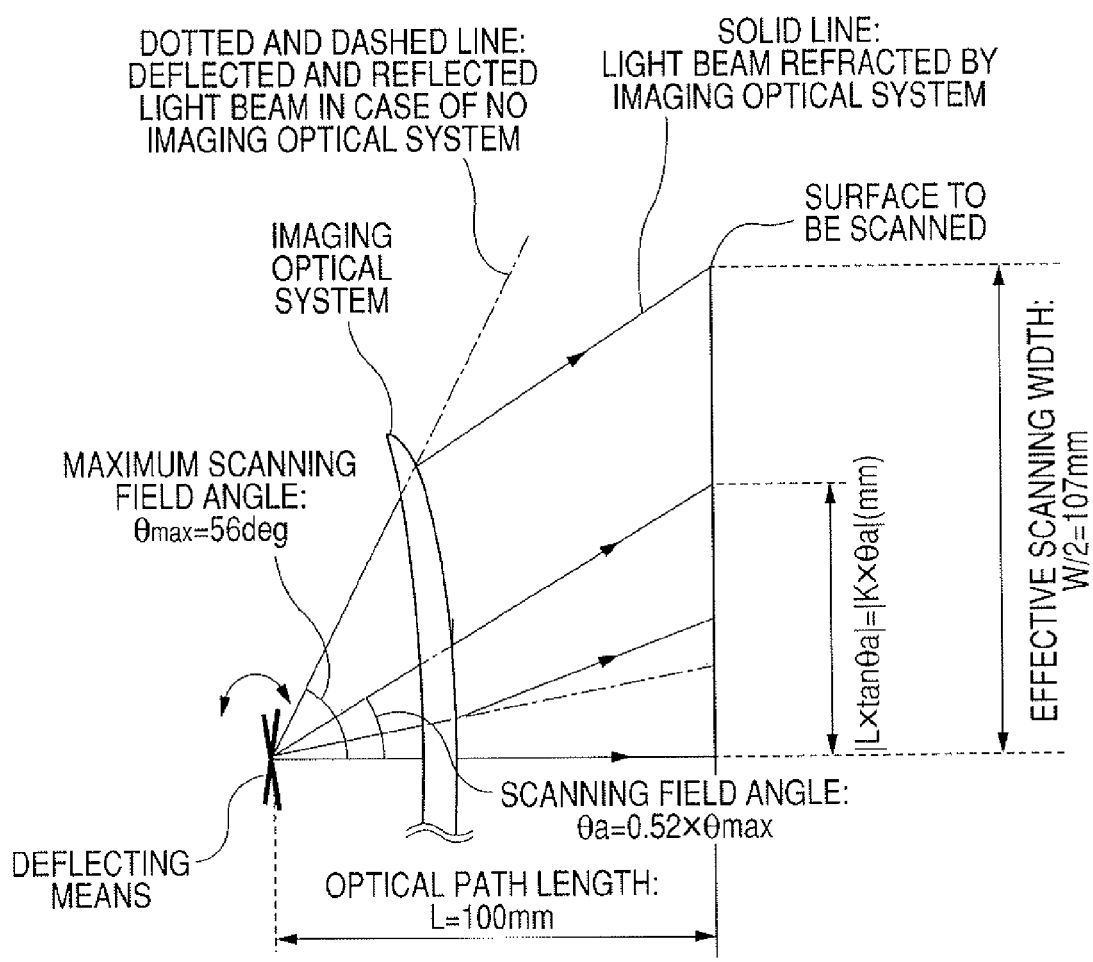
FIG. 13 is an explanatory diagram showing a relationship between |K×θ| and L×tan θ according to Embodiment 1 of the present invention.

FIG. 13 is an explanatory principal part cross sectional diagram in the main scanning direction (main scanning cross sectional diagram) clearly showing the respective relationships of $|L \times \tan(\theta)|$ and $|K \times \theta|$ relative to the arbitrary scanning field angle θ in this embodiment.

As is apparent from FIG. 13, according to this embodiment, a light beam reaches the surface to be scanned 7 at the scanning field angle θa in which it is not refracted. In the scanning field angle region whose scanning field angle is smaller than the scanning field angle θa, the light beam is refracted in the direction departing from the optical axis. In the scanning field angle region whose scanning field angle is larger than the scanning field angle θa, the light beam is refracted in the direction approaching the optical axis.

Here, a relationship among $|L \times \tan(\theta)|$, $|K \times \theta|$, and θa will be described with reference to FIG. 12.

As is apparent from FIG. 12, according to this embodiment, at the scanning field angle θa which is 50% of the maximum scanning field angle θmax (0.52×θmax (deg.)), $|L \times \tan(\theta)| = |K \times \theta|$.

On the axis (θ=0 deg.), each of $|L \times \tan(\theta)|$ and $|K \times \theta|$ becomes 0.

In a region up to the scanning field angle θa (0.52×θmax (deg.)) relative to the axis, $|L \times \tan(\theta)| < |K \times \theta|$ is satisfied because setting is performed such that L<K is satisfied.

In a region formed between the scanning field angle θa and the maximum scanning field angle θmax, $|K \times \theta| < |L \times \tan(\theta)|$ is satisfied.

That is, according to this embodiment, setting is performed such that the following condition is satisfied in the scanning field angle region of "0<|θ|<|θa|".

$$|L \times \tan\theta| < |K \times \theta| \tag{4}$$

Setting is performed such that the following condition is satisfied in the scanning field angle region of "|θa|<|θ|≦|θmax|".

$$|L \times \tan\theta| > |K \times \theta| \tag{5}$$

Therefore, the amount of refracting the light beam or a variation thereof can be reduced in the scanning field angle region whose scanning field angle θa is large. Thus, the fθ characteristic, the field curvature, and other aberrations can be corrected even in the optical scanning apparatus whose optical path length is very short and scanning field angle θa is wide (W/2d=1.07).

Note that, when the scanning field angle θa becomes larger than 0.7×θmax, the amount of refracting the light beam in the direction departing from the optical axis significantly increases in the vicinity of the axis. Therefore, a surface of the lens of the imaging optical system LB becomes a concave surface in which the curvature of the meridional line shape thereof becomes very steep, with the result that formation or processing is difficult.

When the scanning field angle θa becomes smaller than 0.3×θmax, the amount of refracting the light beam in the direction approaching the optical axis significantly increases in the vicinity of the maximum scanning field angle. Therefore, the surface of the lens of the imaging optical system LB becomes the concave surface in which the curvature of the meridional line shape thereof becomes very steep, with the result that formation or processing is difficult.

Thus, according to this embodiment, each element is set to satisfy the following condition.

$$0.3 < |\theta a|/|\theta max| < 0.7 \tag{3}$$

When setting is performed to satisfy the conditional expression (3), it is possible to obtain the imaging lens including the lens surface of the meridional line shape which is easily formed or processed, so a sufficient effect of the present invention can be obtained. Therefore, an image forming apparatus which is compact and has a desirable fθ characteristic can be obtained.

The scanning field angle θa can be set to a scanning field angle which is approximately 50% of the maximum scanning field angle θmax. That is, the conditional expression (3) can be set as follows.

$$0.4 < |\theta a|/|\theta max| < 0.6 \tag{3a}$$

When the conditional expression (3a) is satisfied, the scanning field angle region for refracting the light beam in the direction approaching the optical axis becomes nearly equal to the scanning field angle region for refracting the light beam in the direction departing from the optical axis.

As a result, both a maximum value of the amount of refracting the light beam in the direction approaching the optical axis and a maximum value of the amount of refracting the light beam in the direction departing from the optical axis can be reduced.

Therefore, the more gentle meridional line shape of the lens of the imaging optical system LB is easily obtained. The fθ characteristic can be more completely corrected.

In this embodiment, in order to shorten the optical path length in the main scanning cross section, the incident optical system LA is set such that the natural convergent point corresponds to a position closer to the optical deflector 4 than the surface to be scanned 7 by 40.6 mm.

According to this embodiment, in order to image the light beam onto the surface to be scanned 7 at each scanning field angle, the axial power of the entire imaging optical system LB in the main scanning cross section is set to a negative value.

Figure 14:
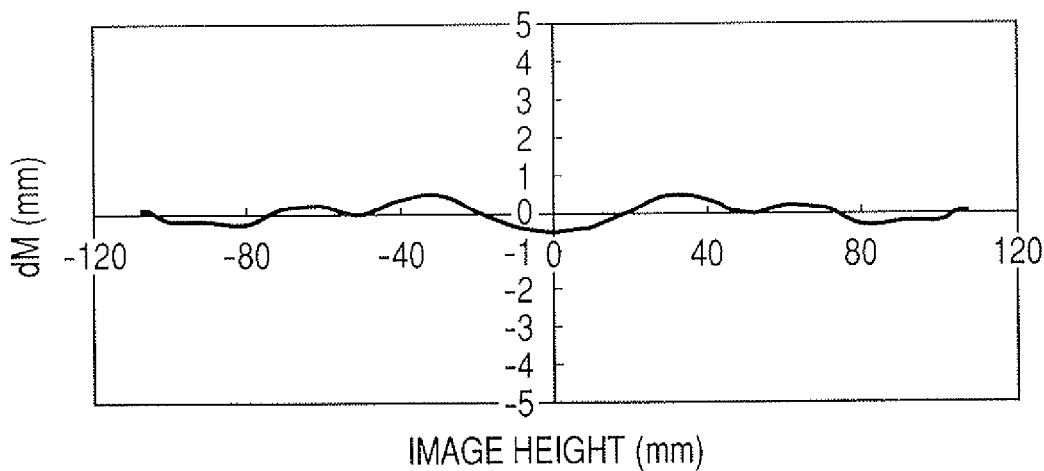
FIG. 14 is a graph showing partial magnification in the main scanning direction according to Embodiment 1 of the present invention.

FIG. 14 is a graph showing the field curvature in the main scanning direction in this embodiment. In FIG. 14, the abscissa indicates an image height and the ordinate indicates an image plane dM in the main scanning direction at each image height.

As is apparent from FIG. 14, according to this embodiment, a difference between a maximum field curvature amount and a minimum field curvature amount in the main scanning direction becomes 1.0 mm. Therefore, the field curvature is desirably corrected to a sufficient level in which there is no problem on an image.

In this embodiment, in the main scanning cross section, an axial focal length of the first imaging lens 6a, $f_{LB}$, an axial focal length of the second imaging lens 6b, $f_{6a}$, and an axial focal length of the entire imaging optical system LB, $f_{6b}$, are set as follows.

$$f_{6a} = -67.83 \text{ mm}, f_{6b} = -60.87 \text{ mm, and } f_{LB} = -27.29 \text{ mm}.$$

That is, in this embodiment, the axial power of the entire imaging optical system LB in the main scanning cross section is set to a negative value. The imaging optical system LB is formed of the two imaging lenses 6a and 6b, each of which has negative axial power in the main scanning direction.

Therefore, according to the structure in this embodiment, a simple meridional line shape in which each curvature radius can be made gentle and formation is easy is employed as compared with the case where one imaging lens has positive axial power and the other imaging lens has negative axial power.

When an axial curvature radius of an imaging lens in the main scanning cross section can be set to a sufficient gentle value, it is unnecessary to set the power of each of the two imaging lenses 6a and 6b of the imaging optical system LB to a negative value.

As described above, according to this embodiment, the ratio W/2L is set to the large value. With such a structure, the maximum effective scanning field angle θmax is set to a wide value of 56 (deg.) in order to realize each optical performance. The present invention is not limited to this. When θmax is equal to or larger than 30 (deg.), the effect of the present invention can be sufficiently obtained.

As described above, according to this embodiment, the optical path length L is set to a very short value of 100 (mm). The present invention is not limited to this. When the following condition is satisfied, the effect of the present invention can be sufficiently obtained.

$$L \leq 125 \text{ (mm)}$$

In this embodiment, the imaging optical system LB is composed of the two imaging lenses. The present invention is not limited to this. The imaging optical system LB may be composed of three or more imaging lenses or may be a single imaging lens.

When the imaging optical system LB is composed of three or more imaging lenses, it is only necessary to replace the first imaging lens 6a by two imaging lenses whose composite focal length is equal to the focal length of the first imaging lens 6a.

When the imaging optical system LB is a single imaging lens, it is only necessary to replace the first and second imaging lenses 6a and 6b by a single imaging lens whose focal length is equal to a composite focal length of the first and second imaging lenses 6a and 6b.

As described above, even when the imaging optical system LB is composed of the three or more imaging lenses or is the single imaging lens, the effect of the present invention can be sufficiently obtained.

Therefore, it is possible to obtain an optical scanning apparatus whose optical path length is short and fθ performance is sufficiently desirable.

In this embodiment, the shape of the imaging lens in the sub-scanning cross section is not described. When optical performances required for the imaging optical system, such as the field curvature in the sub-scanning direction on the surface to be scanned, the uniformity of sub-scanning magnification, and a scanning line curvature, are satisfied, any shape may be employed.

In this embodiment, in order to shorten the optical path length as described above, the degree of convergence of a light beam incident on the optical deflector in the main scanning direction is set to a high value, with the result that convergence jitter (deviation in the main scanning direction, of an irradiation position on the surface to be scanned, which is caused by an uneven amount of the deflecting surface 5) is increased by the unevenness of the deflecting surface.

Therefore, according to this embodiment, an oscillation type optical deflector (galvano mirror) in which the uneven amount of the deflecting surface 5 is small is used in order to reduce the convergence jitter.

The galvano mirror is based on the principle of a galvanometer. Hereinafter, this principle will be briefly described.

When a current is supplied to a movable coil located in a magnetic field, an electromagnetic force is generated based on the current and a magnetic flux, thereby causing a rotating force (torque) proportional to the current.

The movable coil is rotated up to an angle at which the torque and a spring force are balanced. An indicator needle is swung through the movable coil to detect the presence or absence of the current or amplitude thereof. This is the principle of the galvanometer.

Therefore, in the case of the galvano mirror, a reflecting mirror instead of the indicator needle is provided in a shaft rotated in conjunction with the movable coil based on the principle of a galvanometer.

The present invention is not limited to the oscillation type optical deflector. A rotary polygon mirror (polygon mirror) may be used as the optical deflector. The rotary polygon mirror (polygon mirror) has performance capable of being rotated about a rotating shaft at constant angular speed.

The rotary polygon mirror (polygon mirror) has an advantage that the number of refracting surfaces can be increased as compared with the case of the galvano mirror.

However, as in the case of the galvano mirror, the convergence jitter (deviation in the main scanning direction, of the irradiation position on the surface to be scanned, which is caused by the uneven amount of the deflecting surface 5) is generated by the unevenness of the deflecting surface even in the case of the rotary polygon mirror (polygon mirror).

In this embodiment, in order to provide a compact and simple structure, only the anamorphic lens 2 is used for the incident optical system LA. The present invention is not limited to this. For example, when the incident optical system LA is set to satisfy the conditional expression (6), the effect of the present invention can be obtained without depending on any power configuration of the incident optical system LA.

For example, the collimator lens and the cylinder lens having power in the sub-scanning direction may be arranged in order from the light source unit 1 side in the incident optical system LA.

In this embodiment, the meridional line shape of the imaging lens in the main scanning direction is laterally symmetrical with respect to the optical axis. The present invention is not limited to this. For example, the shape of the imaging lens may be formed laterally asymmetrical with respect to the optical axis.

Next, the structure of the optical system of the optical scanning apparatus according to this embodiment is shown in Table 1.

TABLE 1

Structure in Embodiment 1

| | | | |
|---|---|---|---|
| Interval between deflecting surface and surface to be scanned | L | 100 | (mm) |
| Maximum effective scanning field angle | ±θmax | 56 | (deg) |
| Effective scanning width | W | 214 | (mm) |
| fθ factor of imaging optical system | K | 109.5 | (mm/rad) |
| Distance between deflecting surface and natural convergent point | Sd | 59.42 | (mm) |
| Spot diameter of imaging spot in main scanning direction | Pm | 70 | (μm) |
| Aperture diameter in main scanning direction (elliptic shape) | wm | 2.70 | (mm) |
| Focal length of imaging lens 6a in main scanning direction | $f_{6a}$ | −67.83 | (mm) |
| Focal length of imaging lens 6b in main scanning direction | $f_{6a}$ | −60.87 | (mm) |
| Focal length of imaging optical system in main scanning direction | $f_{LB}$ | −27.29 | (mm) |

In addition, "r", "d", and "n" which are related to the imaging optical system in this embodiment are shown in Table 2.

TABLE 2

| | Surface | r | d | n |
|---|---|---|---|---|
| Light emitting point 1 of semiconductor laser | First surface | | 35 | 1 |
| Anamorphic lens 2 | Second surface (2a) | 17.892 | 5 | 1.511 |
| | Third surface (2b) | Table 3 | 20 | 1 |
| Deflecting surface 5 of galvano mirror | Fourth surface | ∞ | 8.400 | 1 |
| First imaging lens 6a | Fifth surface | Table 3 | 6.325 | 1.524 |
| | Sixth surface | Table 3 | 9.600 | 1 |
| Second imaging lens 6b | Seventh surface | Table 3 | 5.700 | 1.524 |

TABLE 2-continued

| Surface | | r | d | n |
|---|---|---|---|---|
| Lens closest to surface to be scanned | Eighth surface | Table 3 | 69.975 | 1 |
| Surface to be scanned 7 | Ninth surface | ∞ | | |

Further, an aspheric shape in this embodiment is shown in Table 3.

TABLE 3

| | | Incident optical system LA Anamorphic lens 2 Third surface (2b) |
|---|---|---|
| Meridional line shape | R | −40.5985 |
| Sagittal line shape | r | −10.2238 |

Note that the aspheric shape is defined by the following expression.

Assume that an intersection point between a curved surface of a lens and the optical axis is set as an origin, the optical axis direction is set as an X-axis, an axis orthogonal to the optical axis in the main scanning plane is set as a Y-axis, and an axis orthogonal to the optical axis with respect to the sub-scanning plane is set as a Z-axis. Here, when a cutting line between an X-Y plane and the curved surface is set as a meridional line and a cutting plane between an X-Z plane and the curved surface in a direction orthogonal to the meridional line is set as a sagittal line, the shape of the meridional line is expressed by the following expression.

$$X = \frac{\frac{Y^2}{R}}{1 + \sqrt{1 - (1+K) \times \left(\frac{Y}{R}\right)^2}} + B_2 Y^2 +$$

$$B_4 Y^4 + + B_6 Y^6 + B_8 Y^8 + B_{10} Y^{10} + B_{12} Y^{12} + B_{14} Y^{14} + B_{16} Y^{16}$$

(where R is a curvature radius and K, $B_2$, $B_4$, $B_6$, $B_8$, $B_{10}$, $B_{12}$, $B_{14}$, and $B_{16}$ are aspherical coefficients of the meridional line).

TABLE 4

| | | Imaging optical system LB First imaging lens 6a | |
|---|---|---|---|
| | | Fifth surface | Sixth surface |
| Meridional line | R | −1.75870E+01 | −3.91060E+01 |
| | K | −9.16685E−01 | −4.96243E+01 |
| | B2 | 3.03838E−07 | −1.35667E−02 |
| | B4 | 1.26504E−07 | 1.80552E−05 |
| | B6 | −1.73754E−09 | 4.70169E−09 |
| | B8 | 0 | −5.92801E−11 |
| | B10 | 0 | 0 |
| | B12 | 0 | 0 |
| | B14 | 0 | 0 |
| | B16 | 0 | 0 |

TABLE 5

| | | Imaging optical system LB Second imaging lens 6b *Lens closest to surface to be scanned | |
|---|---|---|---|
| | | Seventh surface | Eighth surface |
| Meridional line | R | 1.53741E+02 | 2.60870E+01 |
| | K | −4.94601E+00 | −1.29613E+01 |
| | B2 | 8.92409E−04 | −1.58105E−03 |
| | B4 | −2.30961E−05 | −1.80141E−05 |
| | B6 | 2.21500E−08 | 2.10369E−08 |
| | B8 | −9.48436E−12 | −2.45844E−11 |
| | B10 | 8.97564E−16 | 1.80738E−14 |
| | B12 | 6.54806E−19 | −7.42700E−18 |
| | B14 | −1.16244E−22 | 7.48102E−22 |
| | B16 | −3.96251E−26 | 2.43312E−25 |

(Image Forming Apparatus)

Figure 15:
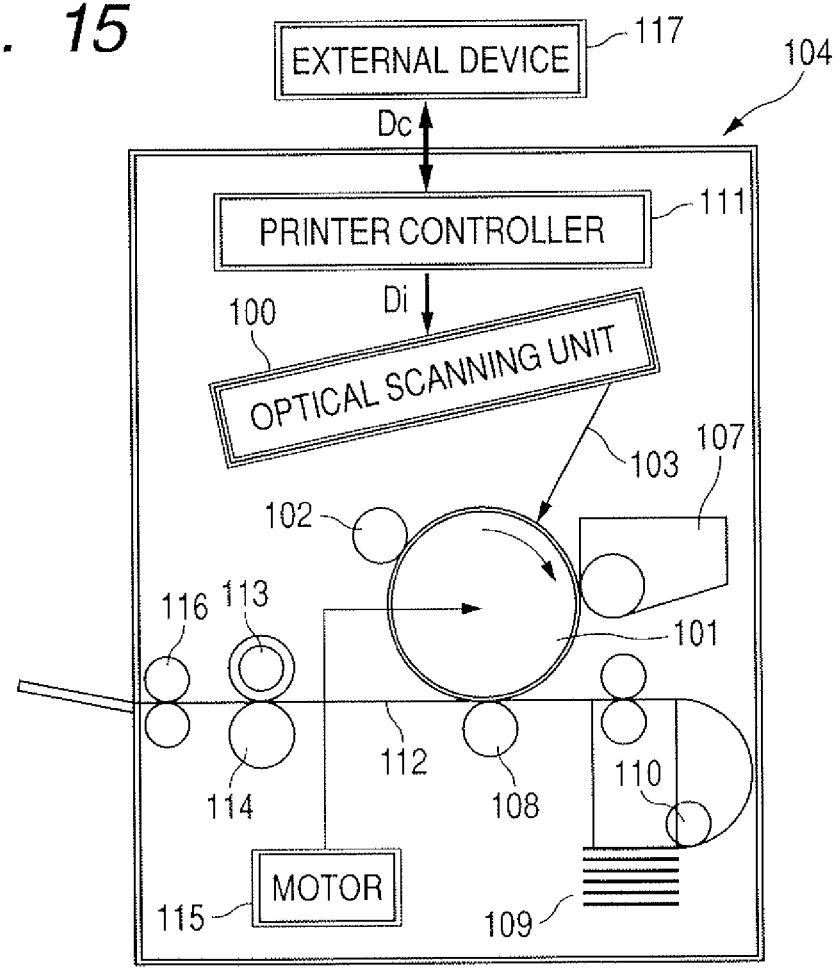
FIG. 15 is a sub-scanning cross sectional diagram showing an image forming apparatus according to an embodiment of the present invention.

FIG. 15 is a principal part cross sectional diagram in the sub-scanning direction, showing an image forming apparatus according to an embodiment of the present invention. In FIG. 15, code data Dc is input from an external device 117 such as a personal computer to an image forming apparatus 104. The code data Dc is converted into image data (dot data) Di by a printer controller 111 in the image forming apparatus. The image data Di is input to an optical scanning unit 100 having the structure described in Embodiment 1. A light beam 103 modulated according to the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. With the rotation, the photosensitive surface of the photosensitive drum 101 is moved relative to the light beam 103 in the sub-scanning direction orthogonal to the main scanning direction. A charging roller 102 for uniformly charging the surface of the photosensitive drum 101 is provided above the photosensitive drum 101 so as to be in contact with the surface thereof. The surface of the photosensitive drum 101 which is charged by the charging roller 102 is irradiated with the light beam 103 scanned by the optical scanning unit 100.

As described above, the light beam 103 is modulated based on the image data Di. The surface of the photosensitive drum 101 is irradiated with the light beam 103 to form an electrostatic latent image thereon. The electrostatic latent image is developed as a toner image by a developing device 107 provided on the downstream side from the irradiation position of the light beam 103 in the rotational direction of the photosensitive drum 101 so as to be in contact with the photosensitive drum 101.

The toner image developed by the developing device 107 is transferred onto a sheet 112 serving as a material to be transferred by a transfer roller 108 provided below the photosensitive drum 101 so as to oppose to the photosensitive drum 101. The sheet 112 is contained in a sheet cassette 109 located in the front (right side in FIG. 15) of the photosensitive drum 101. Manual feed is also possible. A feed roller 110 is provided in the end portion of the sheet cassette 109. The sheet 112 contained in the sheet cassette 109 is sent to a transport path by the feed roller 110.

By the above-mentioned operation, the sheet 112 to which an unfixed toner image is transferred is further transported to a fixing device located in the rear (left side in FIG. 15) of the photosensitive drum 101. The fixing device includes a fixing roller 113 having a fixing heater (not shown) and a pressure roller 114 provided so as to be in press-contact with the fixing roller 113. The sheet 112 transported from the transferring part is heated while it is pressurized in a press-contacting part between the fixing roller 113 and the pressure roller 114, so the unfixed toner image on the sheet 112 is fixed. A delivery roller 116 is provided in the rear of the fixing roller 113. The fixed sheet 112 is delivered to the outside of the image forming apparatus by the delivery roller 116.

Although not shown in FIG. 15, the printer controller 111 conducts not only data conversion described above but also control of each part of the image forming apparatus, which is represented by the motor 115, control of a polygon motor in the optical scanning unit as described later, and the like.

The recording density of the image forming apparatus which is used in the present invention is not particularly limited. When the recording density increases, higher image quality is required. Therefore, the structure according to Embodiment 1 of the present invention further exhibits an effect in the case of the image forming apparatus of 1200 dpi or more.

(Color Image Forming Apparatus)

Figure 16:
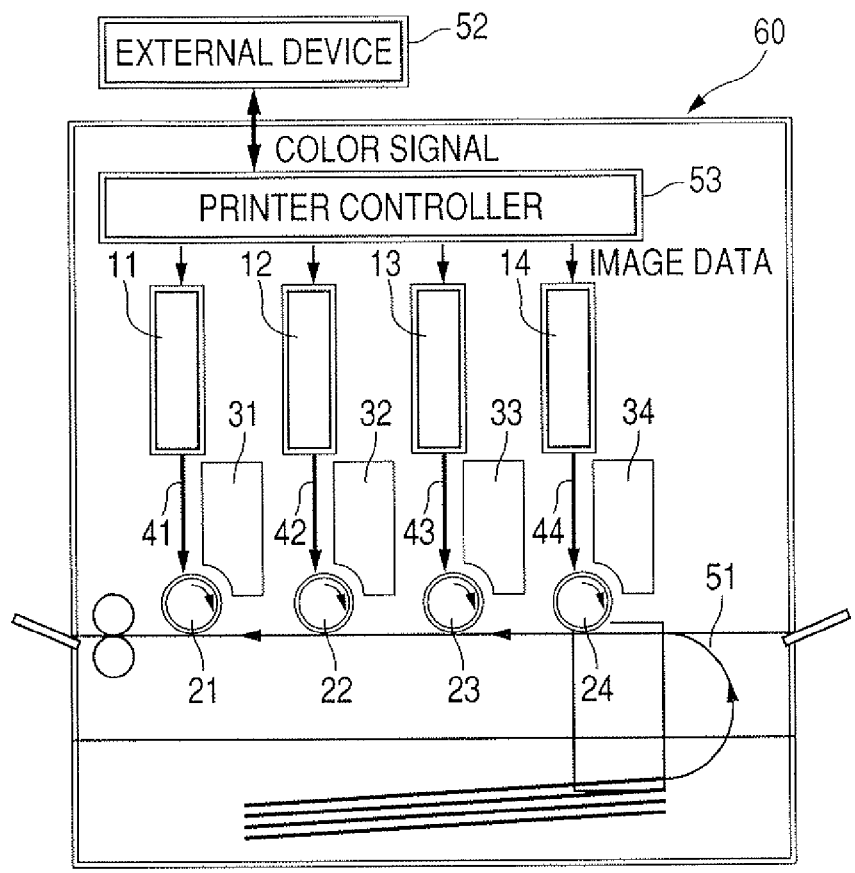
FIG. 16 is a schematic diagram showing a principal part of a color image forming apparatus according to an embodiment of the present invention.
Figure 17:
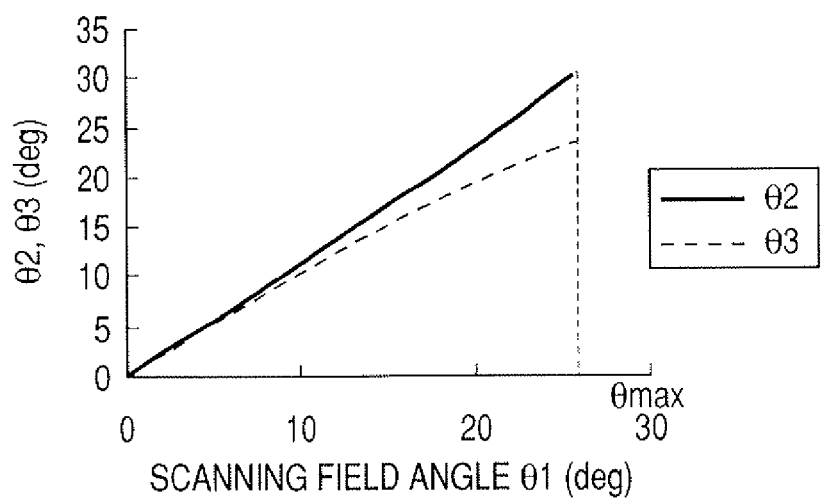
FIG. 17 is a graph showing a correlation between θ2 and θ3 in a conventional optical scanning apparatus (Japanese Patent Application Laid-Open No. 2000-267030).
Figure 18:
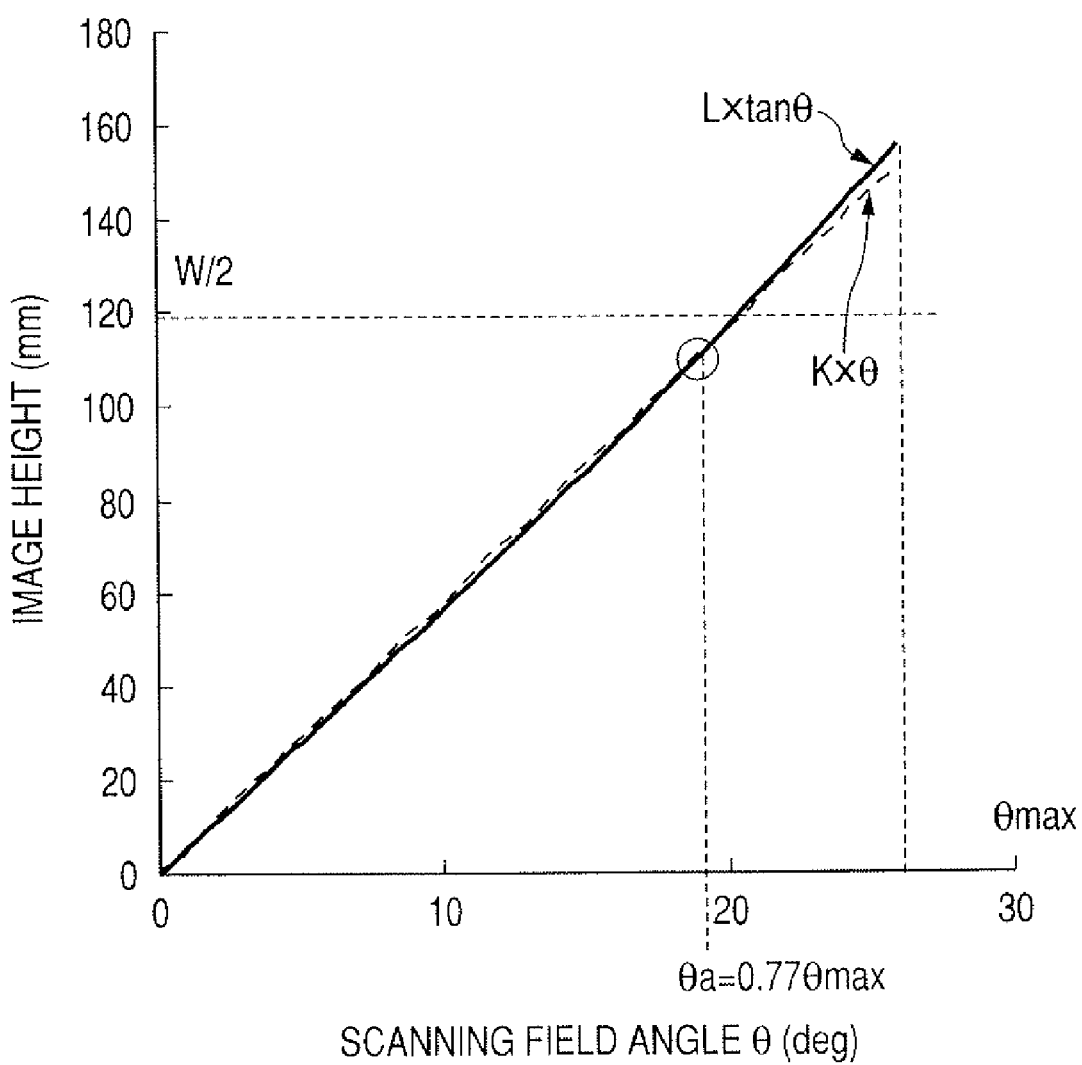
FIG. 18 is a graph showing a correlation between |K×θ| and L×tan θ in the conventional optical scanning apparatus (Japanese Patent Application Laid-Open No. 2000-267030).

FIG. 16 is a principal part schematic diagram showing a color image forming apparatus according to an embodiment of the present invention. This embodiment shows a tandem type color image forming apparatus in which four optical scanning apparatuses (optical imaging optical systems) are arranged to record image information in parallel on surfaces of photosensitive drums, each of which serves as an image bearing member. As shown in FIG. 16, the color image forming apparatus includes a color image forming apparatus 60, the optical scanning apparatuses 11, 12, 13, and 14 each of which has the structure described in Embodiment 1, photosensitive drums 21, 22, 23, and 24 serving as image bearing members, developing units 31, 32, 33, and 34, and a transport belt 51. In FIG. 16, a transferring device (not shown) for transferring a toner image developed by a developing device to a material to be transferred and a fixing device (not shown) for fixing the transferred toner image to the material to be transferred are provided for each of the optical scanning apparatuses.

In FIG. 16, respective color signals of R (red), G (green), and B (blue) are input from an external device 52 such as a personal computer to the color image forming apparatus 60. The color signals are converted into respective image data (dot data) of C (cyan), M (magenta), Y (yellow), and B (black) by a printer controller 53 in the color image forming apparatus. The image data are separately input to the optical scanning apparatuses 11, 12, 13, and 14. Light beams 41, 42, 43, and 44 which are modulated according to the respective image data are emitted from the optical scanning apparatuses. The photosensitive surfaces of the photosensitive drums 21, 22, 23, and 24 are scanned with the light beams in the main scanning direction.

According to the color image forming apparatus in this embodiment, the four optical scanning apparatuses (11, 12, 13, and 14) are arranged corresponding to the respective colors of C (cyan), M (magenta), Y (yellow), and B (black). The image signals (image information) are recorded in parallel on the surfaces of the photosensitive drums 21, 22, 23, and 24, thereby printing a color image at high speed.

According to the color image forming apparatus in this embodiment, as described above, the latent images of the respective colors are formed on the corresponding surfaces of the photosensitive drums 21, 22, 23, and 24 using the light beams based on the respective image data from the four scanning optical devices 11, 12, 13, and 14. After that, the multi-transfer is performed on a recording member to produce a full color image.

For example, a color image reading apparatus including a CCD sensor may be used as the external device 52. In this case, the color image reading apparatus and the color image forming apparatus 60 compose a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-059541, filed Mar. 6, 2006, which is hereby incorporated by reference herein in its entirety.

What is claimed is:

1. An optical scanning apparatus, comprising:
a light source unit;
an incident optical system for guiding a light beam emitted from the light source unit to a deflecting unit; and
an imaging optical system for imaging the light beam deflected by the deflecting unit onto a surface to be scanned,
wherein the following conditions are satisfied, $$0.85 \leq W/2L, \text{ and}$$

$$0.4 < Sd/L < 0.9,$$

where W (mm) represents an effective scanning width on the surface to be scanned, L (mm) represents an interval in an optical axis direction of the imaging optical system between a deflecting surface of the deflecting unit and the surface to be scanned and Sd (mm) represents an interval between the deflecting surface of the deflecting unit and a natural convergent point,
wherein the imaging optical system is constituted by a single imaging optical element LR, and
wherein a scanning field angle region changes from a region in which $|\theta 1| < |\theta 3|$ and $|\theta 2| < |\theta 3|$ are satisfied to a region in which $|\theta 1| > |\theta 3|$ and $|\theta 2| > |\theta 3|$ are satisfied as an absolute value of the scanning field angle ($|\theta 1|$) increases, where in a main scanning cross section and for a finite scanning field angle $\theta 1$ (deg.) ($|\theta 1| > 0$), $\theta 2$ (deg.) represents an angle formed between a principal ray of a light beam incident on the imaging optical element LR and an optical axis of the imaging optical system and $\theta 3$ (deg.) represents an angle formed between a principal ray of a light beam emitted from the imaging optical element LR and the optical axis of the imaging optical system.

2. An image forming apparatus, comprising:
the optical scanning apparatus according to claim 1;
a photosensitive member disposed on the surface to be scanned;
a developing device for developing, as a toner image, an electrostatic latent image which is formed on the photosensitive member scanned with a light beam by the optical scanning apparatus;
a transferring device for transferring the developed toner image to a material to be transferred; and
a fixing device for fixing the transferred toner image to the material to be transferred.

3. An image forming apparatus, comprising:
the optical scanning apparatus according to claim 1; and
a printer controller for converting code data input from an external device into an image signal and outputting the image signal to the optical scanning apparatus.

4. An image forming apparatus, comprising:
the optical scanning apparatus according to claim 1;
a photosensitive member disposed on the surface to be scanned;
a developing device for developing, as a toner image, an electrostatic latent image which is formed on the photosensitive member scanned with a light beam by the optical scanning apparatus;
a transferring device for transferring the developed toner image to a material to be transferred; and
a fixing device for fixing the transferred toner image to the material to be transferred.

5. An image forming apparatus, comprising:
the optical scanning apparatus according to claim 1; and
a printer controller for converting code data input from an external device into an image signal and outputting the image signal to the optical scanning apparatus.

6. An optical scanning apparatus, comprising:
a light source unit;
an incident optical system for guiding a light beam emitted from the light source unit to a deflecting unit; and
an imaging optical system for imaging the light beam deflected by the deflecting unit onto a surface to be scanned,
wherein the following conditions are satisfied, $$0.85 \leq W/2L, \text{ and}$$

$$0.4 < Sd/L < 0.9,$$

where W (mm) represents an effective scanning width on the surface to be scanned, L (mm) represents an interval in an optical axis direction of the imaging optical system between a deflecting surface of the deflecting unit and the surface to be scanned and Sd (mm) represents an interval between the deflecting surface of the deflecting unit and a natural convergent point,
wherein the imaging optical system is constituted by a single imaging optical element LR,
wherein letting θa (rad) be a scanning field angle which is finite, θmax (rad) be a maximum scanning field angle in an effective scanning region, K (mm/rad) be an fθ factor, and θ (rad) be an arbitrary scanning field angle, the following conditions are satisfied, $$|L \times \tan \theta a| = |K \times \theta a| \quad (0 < |\theta a| < |\theta max|) \text{ and}$$

$$0.4 < |\theta a|/|\theta max| < 0.6,$$

and the scanning field angle θa satisfying the following conditions exists, $$|L \times \tan \theta| < |K \times \theta| \quad (\text{when } 0 < |\theta| < |\theta a|), \text{ and}$$

$$|L \times \tan \theta| > |K \times \theta| \quad (\text{when } |\theta a| < |\theta| \leq |\theta max|).$$

7. An image forming apparatus, comprising:
the optical scanning apparatus according to claim 6;
a photosensitive member disposed on the surface to be scanned;
a developing device for developing, as a toner image, an electrostatic latent image which is formed on the photosensitive member scanned with a light beam by the optical scanning apparatus;
a transferring device for transferring the developed toner image to a material to be transferred; and
a fixing device for fixing the transferred toner image to the material to be transferred.

8. An image forming apparatus, comprising:
the optical scanning apparatus according to claim 6; and
a printer controller for converting code data input from an external device into an image signal and outputting the image signal to the optical scanning apparatus.

9. An image forming apparatus, comprising:
the optical scanning apparatus according to claim 6;
a photosensitive member disposed on the surface to be scanned;
a developing device for developing, as a toner image, an electrostatic latent image which is formed on the photosensitive member scanned with a light beam by the optical scanning apparatus;
a transferring device for transferring the developed toner image to a material to be transferred; and
a fixing device for fixing the transferred toner image to the material to be transferred.

10. An image forming apparatus, comprising:
the optical scanning apparatus according to claim 6; and
a printer controller for converting code data input from an external device into an image signal and outputting the image signal to the optical scanning apparatus.

* * * * *